US012715463B2

(12) United States Patent
Zhang et al.

(10) Patent No.: US 12,715,463 B2
(45) Date of Patent: Aug. 25, 2026

(54) DISPLAY METHOD FOR A DRIVING STATE, ELECTRONIC DEVICE, AND STORAGE MEDIUM

(71) Applicant: TENCENT TECHNOLOGY (SHENZHEN) COMPANY LIMITED, Shenzhen (CN)

(72) Inventors: Honglong Zhang, Shenzhen (CN); Zhenji Lv, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 51 days.

(21) Appl. No.: 18/818,242

(22) Filed: Aug. 28, 2024

(65) Prior Publication Data

US 2024/0416946 A1 Dec. 19, 2024

Related U.S. Application Data

(63) Continuation of application No. PCT/CN2023/084570, filed on Mar. 29, 2023.

(30) Foreign Application Priority Data

May 30, 2022 (CN) ........................ 202210600687.7

(51) Int. Cl.
*B60W 50/14* (2020.01)
*B60W 30/12* (2020.01)
(Continued)

(52) U.S. Cl.
CPC ............ *B60W 50/14* (2013.01); *B60W 30/12* (2013.01); *B60W 30/14* (2013.01);
(Continued)

(58) Field of Classification Search
CPC .... B60W 50/14; B60W 60/005; B60W 30/12; B60W 30/14; G01C 21/3676; G06F 3/167; G06T 13/00; G06T 2200/24
(Continued)

(56) References Cited

U.S. PATENT DOCUMENTS

2016/0209840 A1* 7/2016 Kim .................. B60W 60/0059
2018/0105184 A1* 4/2018 Urano ................ B60K 31/0008
(Continued)

FOREIGN PATENT DOCUMENTS

CN 105922995 A 9/2016
CN 209955763 U 1/2020
(Continued)

OTHER PUBLICATIONS

The World Intellectual Property Organization (WIPO) International Search Report for PCT/CN2023/084570 Jun. 3, 2023 6 Pages (including translation).

*Primary Examiner* — Tuan C To
(74) *Attorney, Agent, or Firm* — Anova Law Group, PLLC

(57) ABSTRACT

A display method for a driving state is performed by a computer device and includes: displaying a first stable-state icon on a driving interface of a vehicle, the first stable-state icon being configured for prompting that the vehicle is in a first driving state; displaying a first available-state icon on the driving interface when a driving-state switching condition is satisfied, the first available-state icon being configured for prompting that the vehicle is able to activate a second driving state; and displaying a second stable-state icon on the driving interface in response to the vehicle being switched to the second driving state, the second stable-state icon being configured for prompting that the vehicle is in the second driving state.

20 Claims, 24 Drawing Sheets

(51) Int. Cl.

| | |
|---|---|
| ***B60W 30/14*** | (2006.01) |
| ***B60W 60/00*** | (2020.01) |
| ***G01C 21/36*** | (2006.01) |
| ***G06F 3/16*** | (2006.01) |
| ***G06T 13/00*** | (2011.01) |

(52) U.S. Cl.
CPC ....... *B60W 60/005* (2020.02); *G01C 21/3676* (2013.01); *G06F 3/167* (2013.01); *G06T 13/00* (2013.01); *G06T 2200/24* (2013.01)

(58) Field of Classification Search
USPC ............................................................ 701/23
See application file for complete search history.

(56) References Cited

U.S. PATENT DOCUMENTS

| | | | | |
|---|---|---|---|---|
| 2019/0283770 | A1* | 9/2019 | Kubota | B60W 50/082 |
| 2019/0285173 | A1* | 9/2019 | Chiba | F16H 59/10 |
| 2020/0202535 | A1* | 6/2020 | Lee | H04N 5/145 |
| 2020/0267351 | A1* | 8/2020 | Lee | G06T 7/73 |
| 2020/0307642 | A1* | 10/2020 | Tsuji | B60W 10/04 |
| 2021/0394677 | A1 | 12/2021 | Katagiri et al. | |
| 2022/0066570 | A1* | 3/2022 | Takabatake | B60W 50/14 |
| 2025/0196644 | A1* | 6/2025 | Takano | G08G 1/0962 |

FOREIGN PATENT DOCUMENTS

| | | | | |
|---|---|---|---|---|
| CN | 113232675 A | | 8/2021 | |
| CN | 114162138 A | | 3/2022 | |
| EP | 3091411 A1 | * | 11/2016 | B62D 1/286 |
| EP | 3275716 A1 | * | 1/2018 | G09B 29/00 |
| KR | 20190002950 A | | 1/2019 | |
| WO | WO-2020144974 A1 | * | 7/2020 | B60W 50/14 |

* cited by examiner

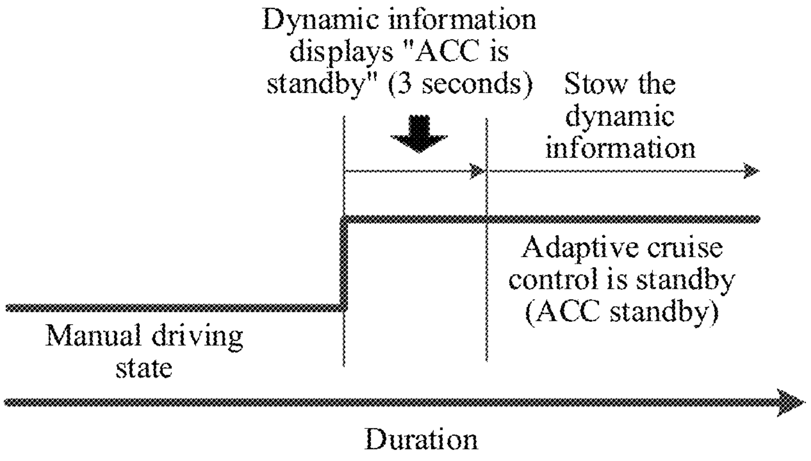
(A)
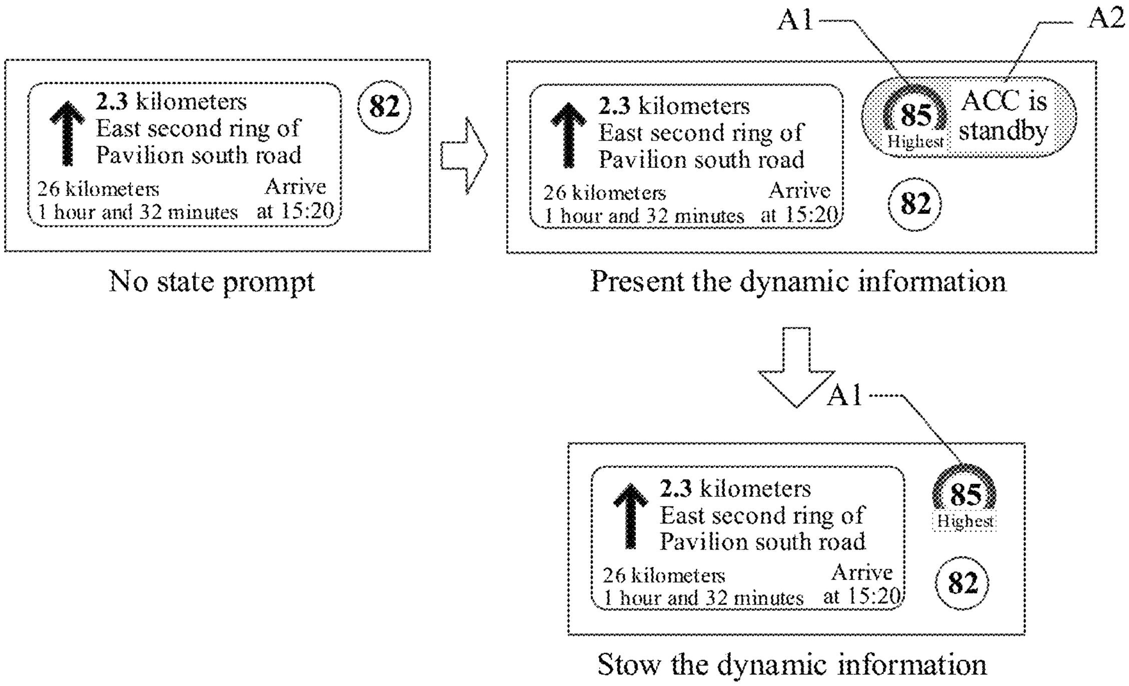
(B)
FIG. 7a

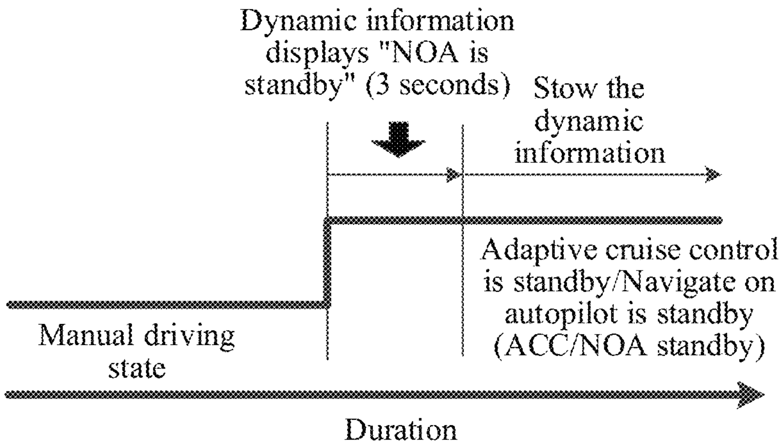
(A)
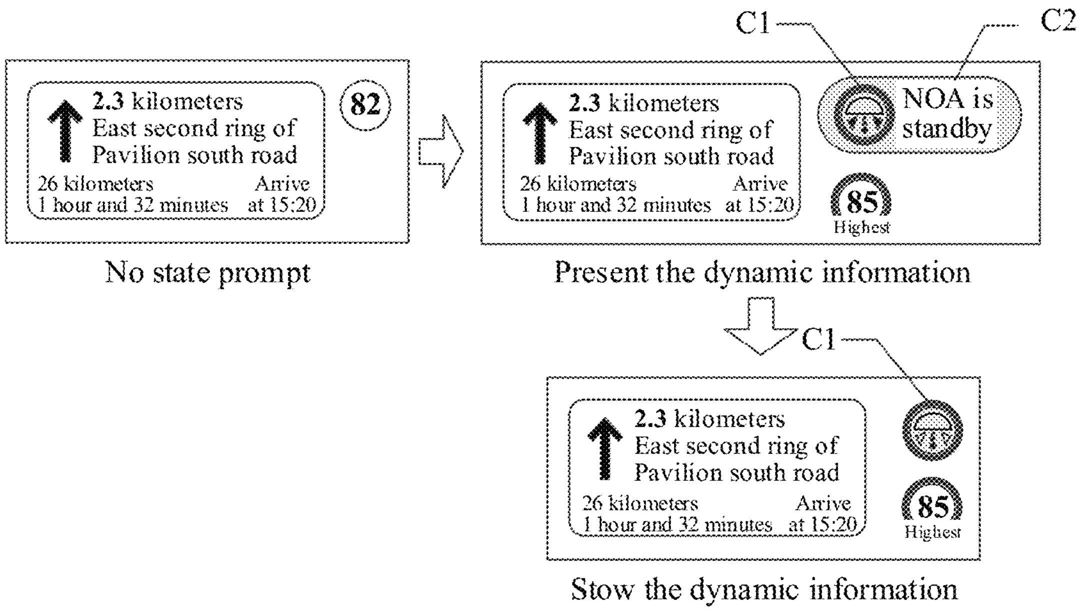
(B)
FIG. 7c

Manual driving state 2.3 kilometers
East second ring of
Pavilion south road
26 kilometers
1 hour and 32 minutes
Arrive
at 15:20
82
F1

Navigate on autopilot is standby

Navigate on autopilot is standby Dynamic information 2.3 kilometers
East second ring of
Pavilion south road
26 kilometers
1 hour and 32 minutes
Arrive
at 15:20
NOA is standby
82
F2
F3

Navigate on autopilot is standby Stable information 2.3 kilometers
East second ring of
Pavilion south road
26 kilometers
1 hour and 32 minutes
Arrive
at 15:20
82

Manual driving

Autonomous driving

Navigate on autopilot is active

Navigate on autopilot is active Dynamic information 2.3 kilometers
East second ring of
Pavilion south road
26 kilometers
1 hour and 32 minutes
Arrive
at 15:20
NOA is active
82
F4
F5

Navigate on autopilot is active Stable information 2.3 kilometers
East second ring of
Pavilion south road
26 kilometers
1 hour and 32 minutes
Arrive
at 15:20
82

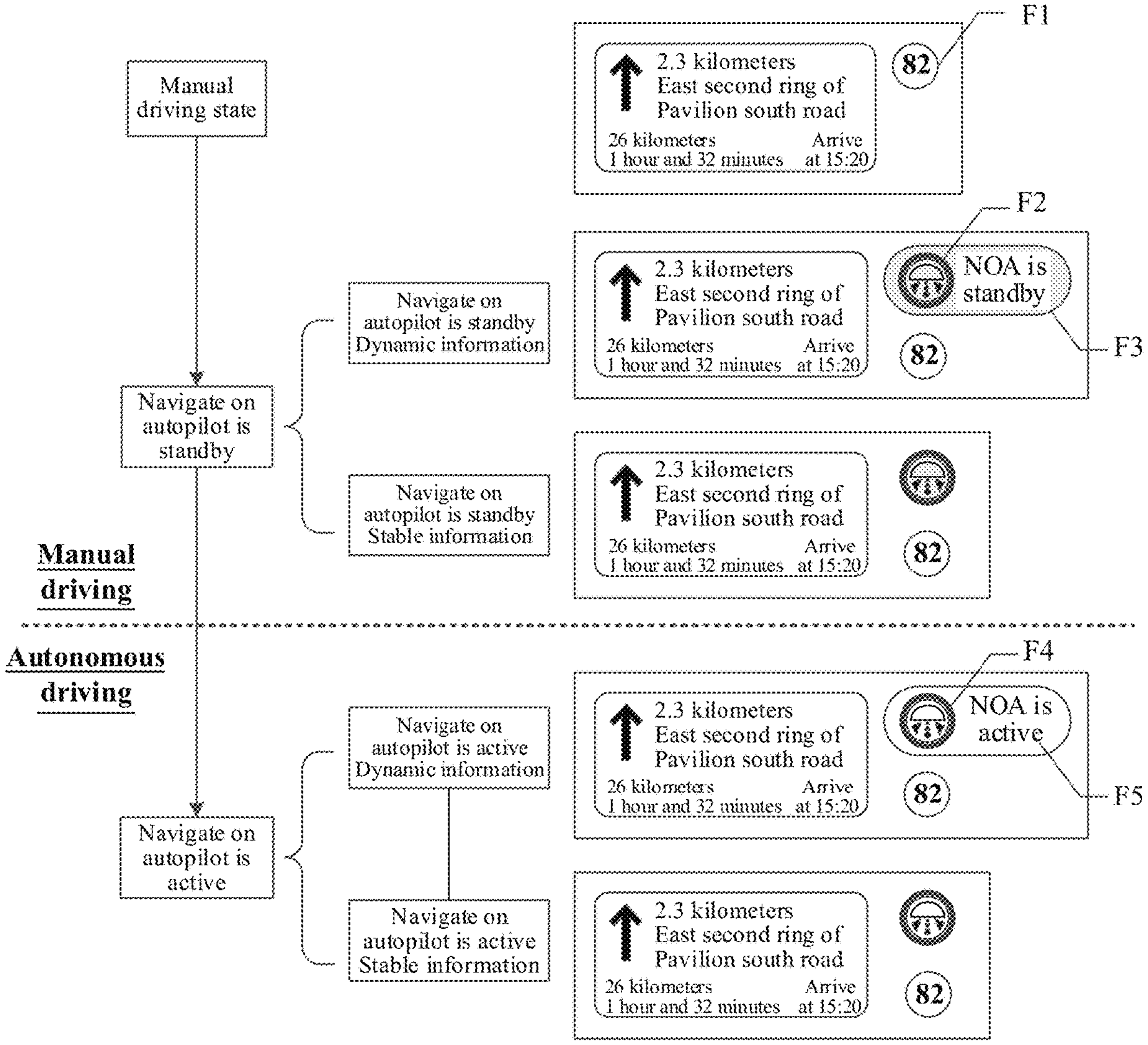

FIG. 9c

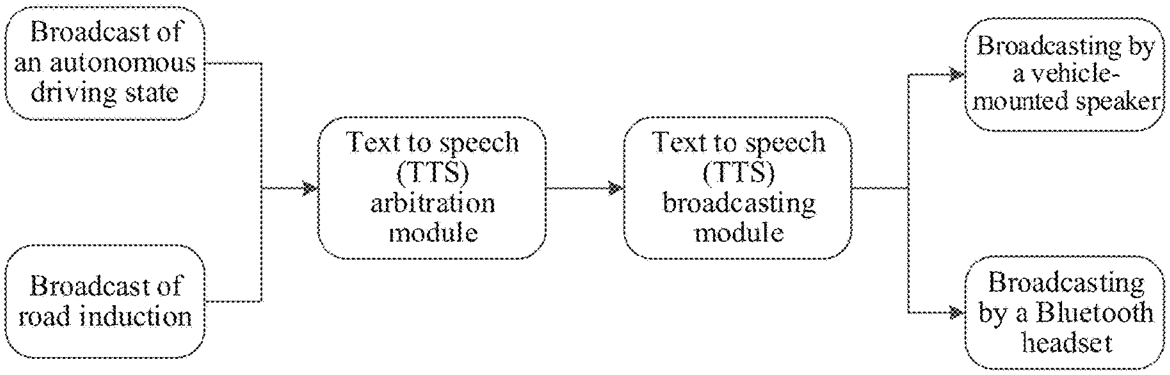

FIG. 10

DISPLAY METHOD FOR A DRIVING STATE, ELECTRONIC DEVICE, AND STORAGE MEDIUM

CROSS-REFERENCES RELATED APPLICATIONS

This application is a continuation application of PCT Patent Application No. PCT/CN2023/084570, filed on Mar. 29, 2023, which claims priority to Chinese Patent Application No. 202210600687.7, filed May 30, 2022, all of which is incorporated herein by reference in their entirety.

FIELD OF THE TECHNOLOGY

The present disclosure relates to the field of autonomous driving technologies, and in particular, to a technology for displaying a driving state.

BACKGROUND OF THE DISCLOSURE

With development of vehicle technologies, human-computer interaction systems are often used in vehicles based on informatization technologies. A user may implement a "dialog" between a human and a vehicle through a human machine interface (HMI) provided by the human-computer interaction systems.

Currently, most vehicle-mounted navigation can provide a navigation map function, a map search function, a vehicle positioning function, a path guidance function, and the like. Accordingly, the user may know current location of the vehicle, road condition information, navigation route, and the like, in time through the HMI, providing the user with more convenient driving experience.

With assisted driving function, it has become normal that the user and the vehicle perform the driving together. Autonomous driving may be classified into a plurality of driving states based on capability complexity of the autonomous driving, and the driving state of the vehicle is displayed on a vehicle-mounted dashboard. However, displaying the driving state by using the vehicle-mounted dashboard has a low intelligence degree, and is not conducive for users to perceiving changes in the driving state in a timely manner.

SUMMARY

One aspect of the present disclosure provides a display method for a driving state. The method is performed by a computer device, and includes: displaying a first stable-state icon on a driving interface of a vehicle, the first stable-state icon being configured for prompting that the vehicle is in a first driving state; displaying a first available-state icon on the driving interface when a driving-state switching condition is satisfied, the first available-state icon being configured for prompting that the vehicle is able to activate a second driving state; and displaying a second stable-state icon on the driving interface in response to the vehicle being switched to the second driving state, the second stable-state icon being configured for prompting that the vehicle is in the second driving state.

Another aspect of the present disclosure provide a computer device. The computer device includes a memory and at least one processor, the memory storing a computer program that, when being executed, causes the at least one processor to perform: displaying a first stable-state icon on a driving interface of a vehicle, the first stable-state icon being configured for prompting that the vehicle is in a first driving state; displaying a first available-state icon on the driving interface when a driving-state switching condition is satisfied, the first available-state icon being configured for prompting that the vehicle is able to activate a second driving state; and displaying a second stable-state icon on the driving interface in response to the vehicle being switched to the second driving state, the second stable-state icon being configured for prompting that the vehicle is in the second driving state.

Another aspect of the present disclosure provides a non-transitory computer-readable storage medium storing a computer program that, when being executed, causes the at least one processor to perform: displaying a first stable-state icon on a driving interface of a vehicle, the first stable-state icon being configured for prompting that the vehicle is in a first driving state; displaying a first available-state icon on the driving interface when a driving-state switching condition is satisfied, the first available-state icon being configured for prompting that the vehicle is able to activate a second driving state; and displaying a second stable-state icon on the driving interface in response to the vehicle being switched to the second driving state, the second stable-state icon being configured for prompting that the vehicle is in the second driving state.

BRIEF DESCRIPTION OF THE DRAWINGS

FIG. 7*a* is a schematic diagram of jumping from a manual driving state to an adaptive-cruise-control driving state according to an embodiment of the present disclosure.

FIG. 7*c* is a schematic diagram of jumping from a manual driving state to a navigate-on-autopilot driving state according to an embodiment of the present disclosure.

FIG. 9*c* is a schematic diagram of an activating process of a navigate-on-autopilot driving state according to an embodiment of the present disclosure.

FIG. 10 is a schematic flowchart of speech broadcast processing according to an embodiment of the present disclosure.

DESCRIPTION OF EMBODIMENTS

Figure 1:
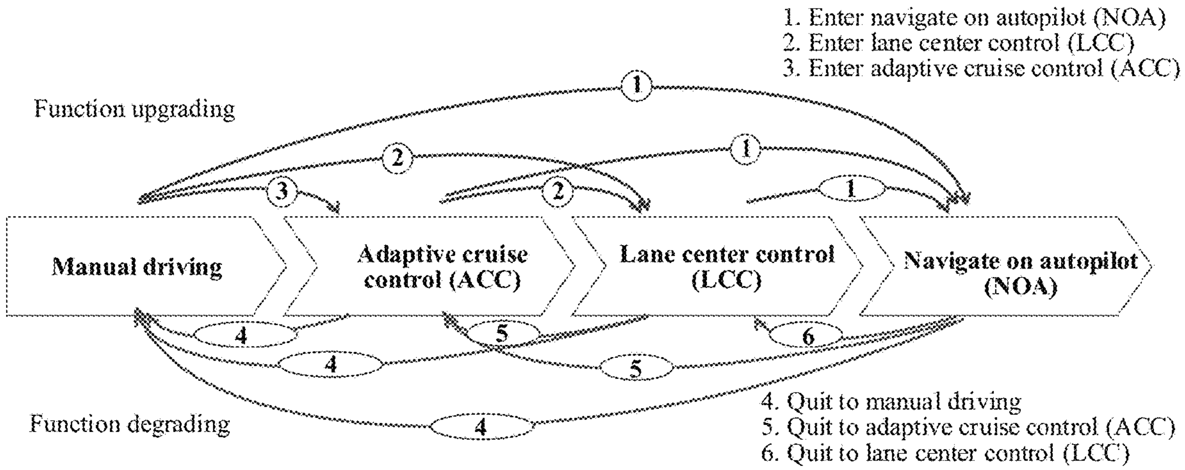
FIG. 1 is a schematic diagram of a state jump logic of autonomous driving according to an embodiment of the present disclosure.

Embodiments of the present disclosure provide a display method for a driving state, a related apparatus, a device, and a storage medium, which may be applied to fields including, but not limited to, a map, navigation, vehicle-to-everything, vehicle-road cooperation, and the like. Application scenarios of the present disclosure at least include various terminals, such as a vehicle-mounted terminal, a mobile phone, and a computer. The present disclosure includes: displaying a first stable-state icon on a driving interface, where the first stable-state icon prompts that a vehicle is in a first driving state; displaying a first available-state icon on the driving interface when a driving-state switching condition is satisfied, where the first available-state icon prompts that the vehicle can activate a second driving state; and displaying a second stable-state icon on the driving interface if the vehicle is switched to the second driving state, where the second stable-state icon prompts that the vehicle is in the second driving state. The present disclosure further provides an apparatus, a device, and a storage medium. In the present disclosure, during driving, different driving states may be presented by using a driving interface, so that perception and understanding of a user for the driving states are enhanced in an intelligent icon-display manner.

Fusion of artificial intelligence and vehicle driving promotes development of an autonomous driving system. In the autonomous driving system, advanced communication, computer, network, and control technologies are used, to continuously control a vehicle in real time. An autonomous vehicle learns a surrounding traffic condition by using a video camera, a radar sensor, and a laser range-finder, and navigates a road ahead through an exhaustive map. Currently, autonomous driving may be classified into six levels, which are L0 to L5 respectively. The following separately describes the six levels.

Autonomous driving level L0: representing non-autonomous driving. To be specific, a human driver has full authority to driving a vehicle.

Autonomous driving level L1: representing auxiliary driving. To be specific, a vehicle provides driving for one of a steering wheel and acceleration/deceleration, and a human driver is responsible for the remaining driving actions.

Autonomous driving level L2: representing partial autonomous driving. To be specific, a vehicle provides driving for a plurality of operations in a steering wheel and acceleration/deceleration, and a human driver is responsible for the remaining driving actions.

Autonomous driving level L3: representing conditional autonomous driving. To be specific, a vehicle completes most driving operations, and a human driver needs to always focus on a vehicle status and prepare for takeover.

Autonomous driving level L4: representing highly autonomous driving. To be specific, a vehicle completes all driving operations, and a human driver does not need to stay focus. However, the autonomous driving level L4 can be implemented only in a specific road condition.

Autonomous driving level L5: representing fully autonomous driving. To be specific, a vehicle completes all driving operations.

Different autonomous driving levels may correspond to one or more driving states. For example, a driving state corresponding to the autonomous driving level L0 may be "manual driving". For example, a driving state corresponding to the autonomous driving level L1 may be "adaptive cruise control (ACC)" or "lane center control (LCC)". A driving state corresponding to the autonomous driving level L2 or the autonomous driving level L3 may be "navigate on autopilot (NOA)". The correspondences between the autonomous driving levels and the driving states are only examples. Solutions provided in the present disclosure may alternatively be applied to another driving state corresponding to the autonomous driving level. This is not limited herein.

The autonomous driving system includes switching between a plurality of driving states. For ease of understanding, FIG. 1 is a schematic diagram of a state jump logic of autonomous driving according to an embodiment of the present disclosure. As shown in the figure, function upgrading refers to gradually upgrading from fully manual driving to higher-order autonomous driving. In one manner, the manual driving may be directly upgraded to the ACC, the LCC, or the NOA. In another manner, activation is performed level-by-level. To be specific, the ACC is first activated, the LCC is then activated, and the NOA is finally activated. Function degrading is contrary to the function upgrading. In one manner, the NOA can be directly degraded to the LCC, the ACC, or the manual driving. In another manner, deactivation is performed level-by-level. To be specific, the LCC is first quit, the ACC is then quit, and the manual driving is finally quit. In each time of upgrading or degrading, different human-computer interaction manners are generated.

Figure 2:
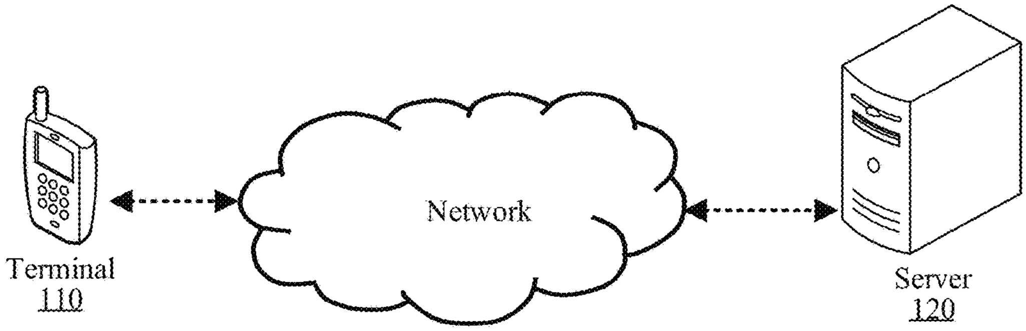
FIG. 2 is a schematic diagram of an architecture of a display system for a driving state according to an embodiment of the present disclosure.

Based on this, the present disclosure provides a display method for a driving state. The display method may be applied to the field of autonomous driving, and specifically, to a vehicle-mounted scenario. To enhance perception and understanding of a user for a driving state in the vehicle-mounted scenario, the present disclosure further provides a display system for a driving state. FIG. 2 is a schematic diagram of an architecture of a display system for a driving state according to an embodiment of the present disclosure. As shown in the figure, the display system for the driving state includes a server and a terminal. The server can provide map data, speech data, and the like, which can be downloaded and used by the terminal.

A client is deployed on the terminal. The client may run on the terminal in a form of a browser, or may run on the terminal in a form of an independent application (APP). A specific representation form of the client is not limited herein. The server in the present disclosure may be an independent physical server, a server cluster or distributed system including a plurality of physical servers, or a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. The terminal may include, but is not limited to, a mobile phone, a computer, an intelligent speech interaction device, an intelligent home appliance, a vehicle-mounted terminal, an aircraft, and the like. The terminal and the server may be connected directly or indirectly in a wired or wireless communication manner. This is not limited in the present disclosure. A quantity of servers and a quantity of terminals are not limited either. The solutions provided in the present disclosure may be independently completed by the terminal, may be independently completed by the server, or may be completed by the terminal and the server in cooperation. This is not specifically limited in the present disclosure.

Figure 3:
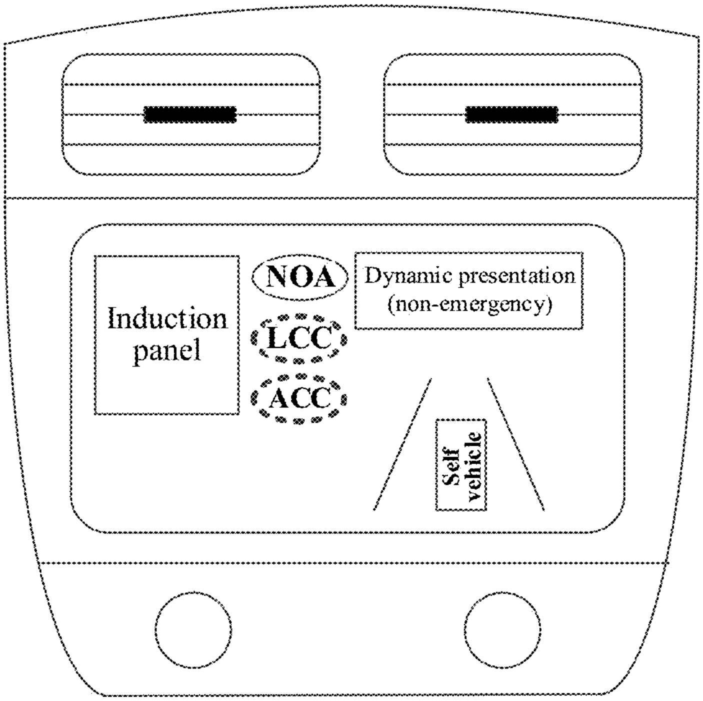
FIG. 3 is a schematic diagram of a driving interface according to an embodiment of the present disclosure.

The following describes, with reference to FIG. 3, a driving interface displayed on the terminal. FIG. 3 is a schematic diagram of a driving interface according to an embodiment of the present disclosure. As shown in the figure, an induction panel is represented on the driving interface. Information about a maneuver point on a road (for example, a type of the maneuver point, a distance of the maneuver point, and a name of the maneuver point) is displayed on the induction panel. In addition, an area of a driving state is further represented on the driving interface. For example, an NOA driving state is represented in an NOA area, and a current state change is displayed in a simple prompt (toast) area near the NOA. An LCC driving state is represented in an LCC area. An ACC driving state is represented in an ACC area. A background part of the driving interface may represent a map, and a square represents a location of a self vehicle (or a vehicle, or a target vehicle). A line near the self vehicle represents a lane line, and is configured for showing a state such as lane locking, lane departure, or lane changing.

During actual application, if the NOA driving state is represented in the NOA area, the corresponding driving states are not represented in the LCC area and the ACC area. If the LCC driving state is represented in the LCC area, the corresponding driving states are not represented in the NOA area and the ACC area. If the ACC driving state is represented in the ACC area, the corresponding driving states are not represented in the NOA area and the LCC area.

In view of that some terms related to professional fields are involved in the present disclosure, for ease of understanding, explanation is provided below.

(1) HMI: Human machine interface. The HMI may refer to a human-computer interaction interface of a vehicle-mounted cockpit system.

(2) ACC: Adaptive cruise control. In an autonomous driving system, a speed of a self vehicle is dynamically adjusted based on a cruise speed set by a user and a safe distance from a front vehicle. When the front vehicle accelerates, the self vehicle accelerates to the set speed. When the front vehicle decelerates, the self vehicle decelerates, to maintain the safe distance between the self vehicle and the front vehicle.

(3) LCC: Lane center control. The lane center control is a function provided by autonomous driving to assist a driver in controlling a steering wheel, and can continuously keep a vehicle centered in a current lane.

(4) NOA: Navigate-on-autopilot driving function. In this function, a vehicle may be guided to autonomously travel once a destination is set, and operations such as lane changing and overtaking, autonomously driving in, and driving out of a ramp may be completed under attention of a driver. A driving behavior of the NOA includes cruise, following, autonomous obstacle avoidance, autonomous acceleration/deceleration, giving way, planning of a lane-changing behavior under a single rule (for example, merging into a fast lane or exiting with expectation), decision of a lane-changing behavior under a plurality of conditions (for example, lane changing during cruise), and the like.

(5) Maneuver point: A location at which a driver is guided to perform a maneuver action such as steering, deceleration, merging, and driving out in map navigation. The maneuver point usually includes locations of intersection turning, intersection diverting, intersection merging, and the like.

(6) Text to speech (TTS): A type of speech synthesis application. The text to speech converts text content stored in a computer into natural speech output.

(7) Vehicle-falling point: A location of a self vehicle when an autonomous driving system completes autonomous lane changing.

Figure 4:
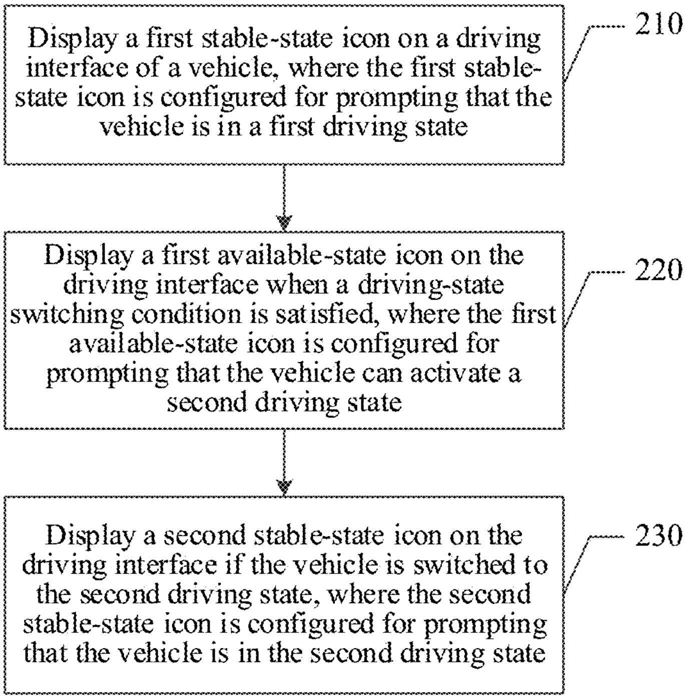
FIG. 4 is a schematic flowchart of a display method for a driving state according to an embodiment of the present disclosure.

With reference to the foregoing descriptions, the following describes the display method for the driving state in the present disclosure. Referring to FIG. 4, the display method for the driving state in the embodiments of the present disclosure may be performed by a computer device. In one embodiment, the computer device may be a terminal. The method includes the following operations.

210: Display a first stable-state icon on a driving interface of a vehicle such as a target vehicle, where the first stable-state icon is configured for prompting that the target vehicle is in a first driving state.

In various embodiments, when the target vehicle is in the first driving state, the first stable-state icon may be displayed on the driving interface. Based on this, a user may learn, in time based on the first stable-state icon, that the target vehicle is currently in the first driving state.

220: Display a first available-state icon on the driving interface when a driving-state switching condition is satisfied, where the first available-state icon is configured for prompting that the target vehicle can activate a second driving state.

In various embodiments, an autonomous driving system may determine, in combination with a user operation, a traveling speed of the target vehicle, a location of the target vehicle, a current road condition, and the like, whether the driving-state switching condition is satisfied. If the driving-state switching condition is satisfied, the first available-state icon is displayed on the driving interface. Based on this, the user may learn, in time based on the first available-state icon, that the target vehicle can currently activate the second driving state.

In one embodiment, the driving-state switching condition includes, but is not limited to, an ACC driving-state switching condition, an LCC driving-state switching condition, and an NOA driving-state switching condition. Usually, based on the different driving-state switching conditions, the second driving state may be different. For example, if the ACC driving-state switching condition is satisfied, the first available-state icon is configured for prompting that the target vehicle can activate an ACC driving state, that is, the second driving state is the ACC driving state. For example, when the LCC driving-state switching condition is satisfied, the first available-state icon is configured for prompting that the target vehicle can activate an LCC driving state, that is, the second driving state is the LCC driving state. For example, when the NOA driving-state switching condition is satisfied, the first available-state icon is configured for prompting that the target vehicle can activate an NOA driving state, that is, the second driving state is the NOA driving state.

230: Display a second stable-state icon on the driving interface if the target vehicle is switched to the second driving state, where the second stable-state icon is configured for prompting that the target vehicle is in the second driving state.

In various embodiments, if the target vehicle switches from the first driving state to the second driving state, the second stable-state icon is displayed on the driving interface. Based on this, a user may learn, in time based on the second stable-state icon, that the target vehicle is currently in the second driving state.

For example, when the ACC driving-state switching condition is satisfied, the first available-state icon prompts that the target vehicle can activate the ACC driving state. In this case, the second driving state is the ACC driving state. Based on this, if the target vehicle is switched to the ACC driving state, the second stable-state icon is configured for prompting that the target vehicle is in the ACC driving state.

For example, when the LCC driving-state switching condition is satisfied, the first available-state icon prompts that the target vehicle can activate the LCC driving state. In this case, the second driving state is the LCC driving state. Based on this, if the target vehicle is switched to the LCC driving state, the second stable-state icon is configured for prompting that the target vehicle is in the LCC driving state.

For example, when the NOA driving-state switching condition is satisfied, the first available-state icon prompts that the target vehicle can activate the NOA driving state. In this case, the second driving state is the NOA driving state. Based on this, if the target vehicle is switched to the NOA driving state, the second stable-state icon is configured for prompting that the target vehicle is in the NOA driving state.

In this embodiment of the present disclosure, the display method for the driving state is provided. In the foregoing manner, during driving, different driving states may be presented by using the driving interface, so that perception and understanding of a user for the driving states are enhanced in an intelligent icon-display manner.

Based on the foregoing embodiments corresponding to FIG. 4, in another embodiment of the present disclosure, the first driving state is a manual driving state, and the second driving state is an adaptive-cruise-control driving state.

Alternatively, the first driving state is a manual driving state, and the second driving state is a lane-center-control driving state.

Alternatively, the first driving state is a manual driving state, and the second driving state is a navigate-on-autopilot driving state.

Alternatively, the first driving state is an adaptive-cruise-control driving state, and the second driving state is a lane-center-control driving state.

Alternatively, the first driving state is an adaptive-cruise-control driving state, and the second driving state is a navigate-on-autopilot driving state.

Alternatively, the first driving state is a lane-center-control driving state, and the second driving state is a navigate-on-autopilot driving state.

In various embodiments, a plurality of switchable driving-state types are described. It can be learned from the foregoing embodiments that, before function upgrading is implemented, a corresponding prompt of a driving-state change may be provided by using the driving interface. With reference to the state jump logic of the autonomous driving shown in FIG. 1, in the present disclosure, switching of the following driving states may be supported.

(1) The first driving state is the manual driving state, and the second driving state is the ACC driving state. In this case, the first available-state icon indicates that the target vehicle can currently activate the ACC driving state (that is, ACC Standby).

(2) The first driving state is the manual driving state, and the second driving state is the LCC driving state. In this case, the first available-state icon indicates that the target vehicle can currently activate the LCC driving state (that is, LCC Standby).

(3) The first driving state is the manual driving state, and the second driving state is the NOA driving state. In this case, the first available-state icon indicates that the target vehicle can currently activate the NOA driving state (that is, NOA Standby).

(4) The first driving state is the ACC driving state, and the second driving state is the LCC driving state. In this case, the first available-state icon indicates that the target vehicle can currently activate the LCC driving state (that is, LCC Standby).

(5) The first driving state is the ACC driving state, and the second driving state is the NOA driving state. In this case, the first available-state icon indicates that the target vehicle can currently activate the NOA driving state (that is, NOA Standby).

(6) The first driving state is the LCC driving state, and the second driving state is the NOA driving state. In this case, the first available-state icon indicates that the target vehicle can currently activate the NOA driving state (that is, NOA Standby).

Figure 5:
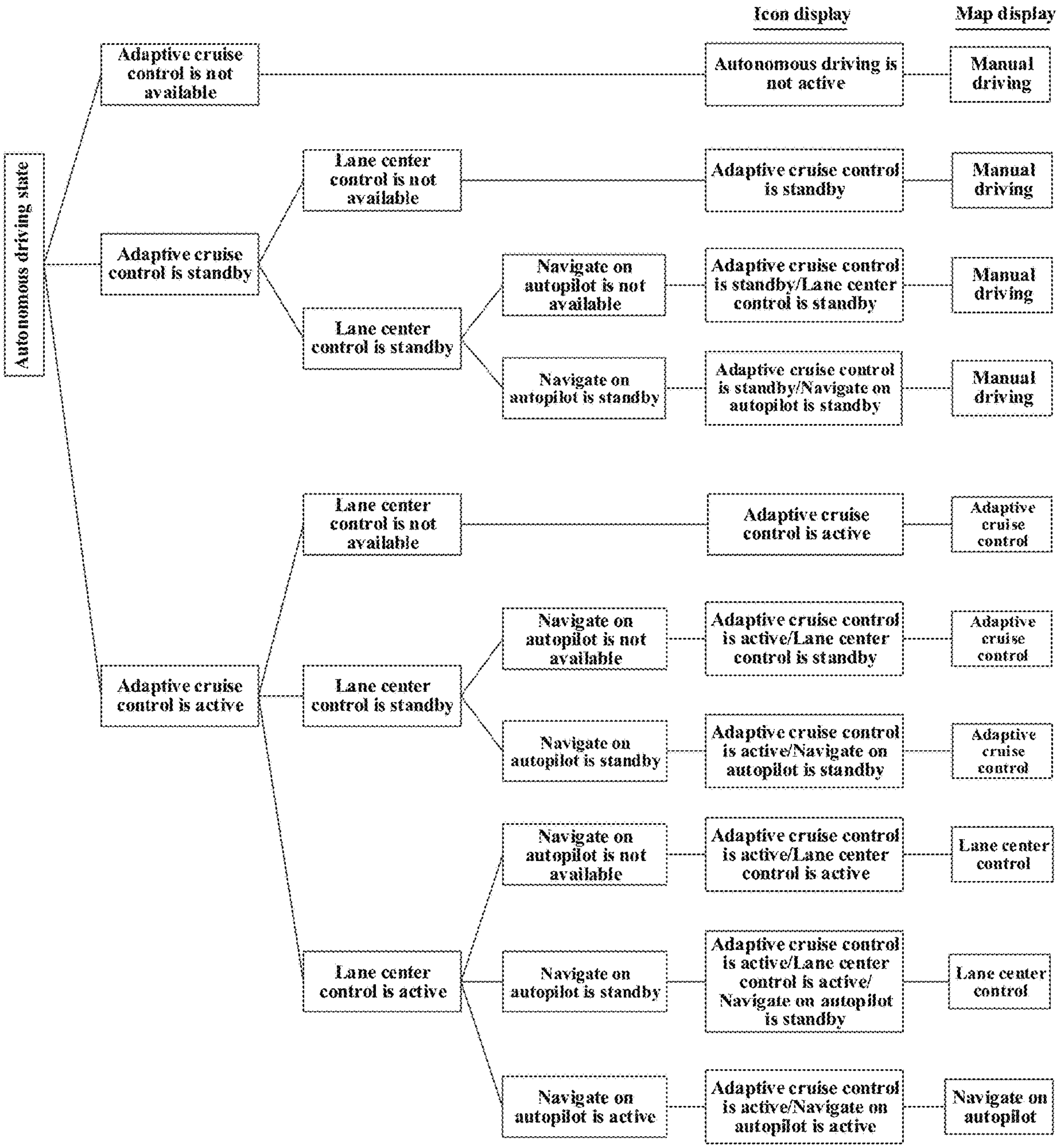
FIG. 5 is a schematic diagram of state changes of an autonomous driving system according to an embodiment of the present disclosure.

In a board sense, an autonomous driving state may be classified into an activated state and a non-activated state. In a narrow sense, the autonomous driving state includes the ACC driving state, the LCC driving state, and the NOA driving state. Based on this, for ease of understanding, FIG. 5 is a schematic diagram of state changes of an autonomous driving system according to an embodiment of the present disclosure. As shown in the figure, it is assumed that a driving state of the autonomous driving system complies a procedure that the ACC driving state is first entered, the LCC driving state is then entered, and the NOA driving state is finally entered. The ACC driving state specifically includes a not available state, a standby state, and an active state. The LCC driving state specifically includes a not available state, a standby state, and an active state. The NOA driving state specifically includes a not available state, a standby state, and an active state. In the figure, "icon display" represents an image status displayed on the driving interface, and "map display" represents a map status displayed on the driving interface.

With reference to change relationships between the driving states shown in FIG. 5, when an original driving state jumps to a new driving state, a corresponding prompt may be provided based on content shown in Table 1. A vertical direction in Table 1 represents the original driving state, and a horizontal direction represents the new driving state. The original driving state and the new driving state respectively include nine state types.

TABLE 1

| | Original driving state | | | | | | | | | |
|---|---|---|---|---|---|---|---|---|---|---|
| New driving state | No AD function | ACC standby | ACC/ LCC standby | ACC/ NOA standby | ACC active | ACC active/ LCC standby | ACC active/ NOA standby | ACC active/ LCC active | ACC/LCC active NOA standby | ACC/ NOA active |
| No AD function | — | ACC is standby | LCC is standby | NOA is standby | ACC is active | ACC is active | ACC is active | LCC is active | LCC is active | NOA is active |
| ACC standby | — | — | LCC is standby | NOA is standby | ACC is active | ACC is active | ACC is active | LCC is active | LCC is active | NOA is active |
| ACC/LCC standby | — | — | — | NOA is standby | ACC is active | ACC is active | ACC is active | LCC is active | LCC is active | NOA is active |
| ACC/NOA standby | — | — | — | — | ACC is active | ACC is active | ACC is active | LCC is active | LCC is active | NOA is active |
| ACC active | ACC is quit | ACC is quit | ACC is quit | ACC is quit | — | LCC is standby | NOA is standby | LCC is active | LCC is active | NOA is active |
| ACC active/ LCC standby | ACC is quit | ACC is quit | ACC is quit | ACC is quit | — | — | NOA is standby | LCC is active | LCC is active | NOA is active |
| ACC active/ NOA standby | ACC is quit | ACC is quit | ACC is quit | ACC is quit | — | — | — | LCC is active | LCC is active | NOA is active |
| ACC active/ LCC active | LCC is quit | LCC is quit | LCC is quit | LCC is quit | LCC is quit | LCC is quit | LCC is quit | — | NOA is standby | NOA is active |
| ACC/LCC active NOA standby | LCC is quit | LCC is quit | LCC is quit | LCC is quit | LCC is quit | LCC is quit | LCC is quit | — | — | NOA is active |
| ACC/NOA active | NOA is quit | NOA is quit | NOA is quit | NOA is quit | NOA is quit | NOA is quit | NOA is quit | NOA is quit | NOA is quit | — |

"No AD function" indicates that autonomous driving is not activated.

"ACC standby" indicates that the ACC driving state can be activated.

"ACC/LCC standby" indicates that both the ACC driving state and the LCC driving state can be activated.

"ACC/NOA standby" indicates that both the ACC driving state and the NOA driving state can be activated.

"ACC active" indicates that the ACC driving state is activated.

"ACC active/LCC standby" indicates that the ACC driving state is activated and the LCC driving state can be activated.

"ACC active/NOA standby" indicates that the ACC driving state is activated and the NOA driving state can be activated.

"ACC/LCC active" indicates that both the ACC driving state and the LCC driving state are activated.

"ACC/LCC active NOA standby" indicates that both the ACC driving state and the LCC driving state are activated, and the NOA driving state can be activated.

"ACC/NOA active" indicates that both the ACC driving state and the NOA driving state are activated.

Next, in this embodiments of the present disclosure, a plurality of switchable driving-state types are provided. In the foregoing manner, switching can be implemented between the manual driving state, the ACC driving state, the LCC driving state, and the NOA driving state, thereby improving flexibility and feasibility of the solution.

Based on the foregoing embodiments corresponding to FIG. 4, in another embodiment of the present disclosure, the display method may further include:

playing first dynamic information on the driving interface when the driving-state switching condition is satisfied, where the first dynamic information is configured for prompting that the target vehicle can activate the second driving state; and canceling playing the first dynamic information on the driving interface when play duration of the first dynamic information reaches a first play-duration threshold.

In various embodiments, a manner of playing a dynamic message based on a standby state is described. It can be learned from the foregoing embodiments that, when the driving-state switching condition is satisfied, the first dynamic information may further be played. Based on this, the user may learn, in time based on the first dynamic information, that the target vehicle can currently activate the second driving state. The first available-state icon is a static icon, but the first dynamic information is a toast. A text may be displayed on the toast, and is an explanation of the icon. In addition, the toast is dynamically displayed and disappears after the presentation. Therefore, interference to a user is slight. The presentation of the icon is classified into static presentation and dynamic presentation. The static presentation refers to that the state icon is always displayed in a current stable state. The dynamic presentation refers to that, when the driving state changes, a dynamic state bar is extended based on the static icon, to display a text of the current state.

Figure 6:
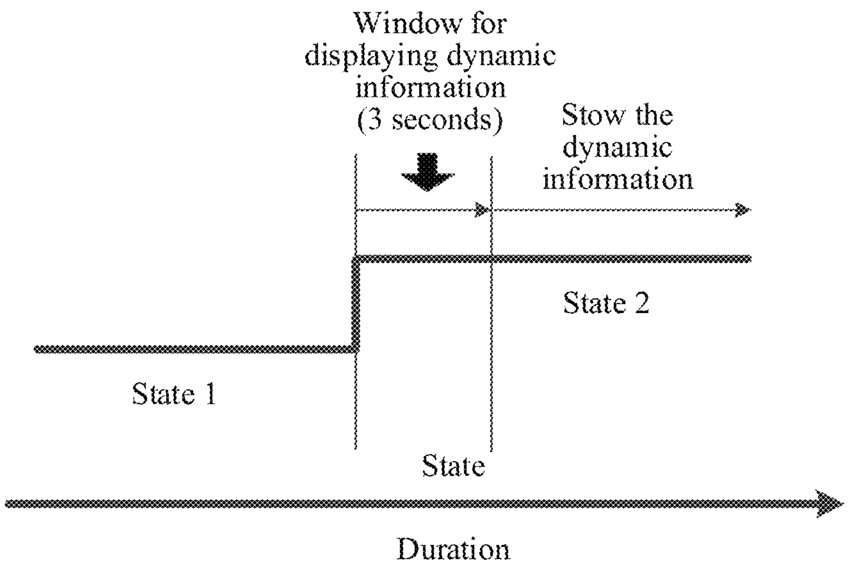
FIG. 6 is a schematic diagram of a window for displaying dynamic information according to an embodiment of the present disclosure.

For ease of understanding, FIG. 6 is a schematic diagram of a window for displaying dynamic information according to an embodiment of the present disclosure. As shown in the figure, a driving state jumps from a "state 1" to a "state 2" over time, and the first dynamic information and the first available-state icon start to be represented immediately at the jump. When the play duration of the first dynamic information reaches the first play-duration threshold, the playing of the first dynamic information is canceled on the driving interface. To be specific, the first dynamic information is stowed, and only the first available-state icon is retained. A process of jumping from the manual driving state to another standby driving state is described below with reference to the drawings. The first play-duration threshold may be set in advance based on a requirement, for example, may be 3 seconds. A value of the first play-duration threshold is not limited in this embodiment of the present disclosure.

1. Jump from the Manual Driving State to an ACC Standby Driving State.

For example, for ease of understanding, FIG. 7*a* is a schematic diagram of jumping from a manual driving state to an adaptive-cruise-control driving state according to an embodiment of the present disclosure. As shown in (A) of FIG. 7*a*, a "state 1" is a manual driving state, and a "state 2" is an ACC standby driving state (ACC standby). Based on this, referring to (B) of FIG. 7*a*, there is no state prompt in the "state 1". When the "state 1" jumps to the "state 2" over time, a first available-state icon (namely, an ACC standby icon) indicated by A1 and first dynamic information (namely, dynamic information of ACC standby) indicated by A2 are displayed. When play duration of the first dynamic information reaches a first play-duration threshold (for example, 3 seconds), the first dynamic information is stowed, and the first available-state icon is retained.

2. Jump from the Manual Driving State to an LCC Standby Driving State.

Figure 7B:
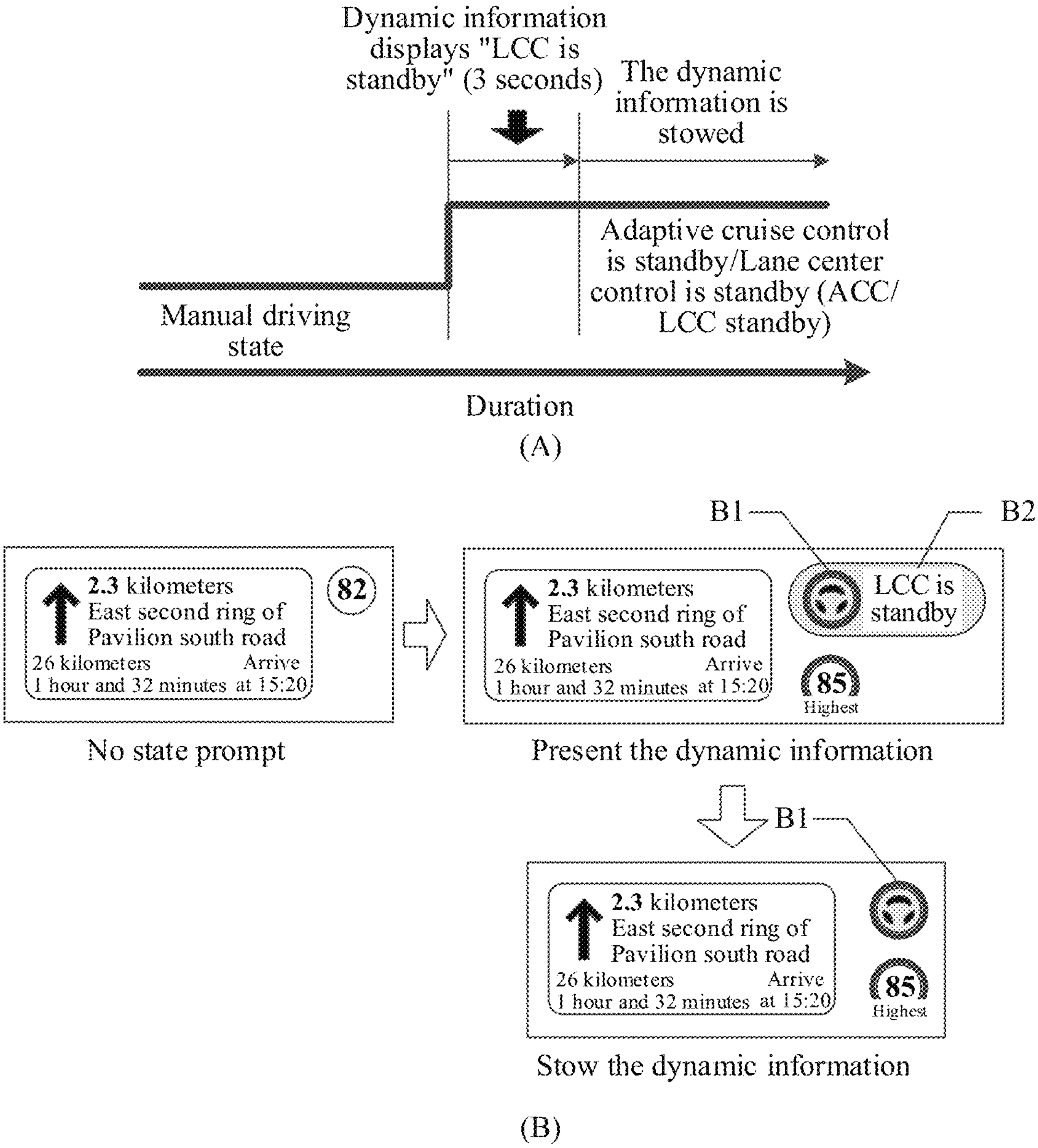
FIG. 7*b* is a schematic diagram of jumping from a manual driving state to a lane-center-control driving state according to an embodiment of the present disclosure.

For example, for ease of understanding, FIG. 7*b* is a schematic diagram of jumping from a manual driving state to a lane-center-control driving state according to an embodiment of the present disclosure. As shown in (A) of FIG. 7*b*, a "state 1" is a manual driving state, and a "state 2" is that both an ACC driving state and an LCC driving state can be activated (ACC/LCC standby). Based on this, referring to (B) of FIG. 7*b*, there is no state prompt in the "state 1". When the "state 1" jumps to the "state 2" over time, a first available-state icon (namely, an LCC standby icon) indicated by B1 and first dynamic information (namely, dynamic information of LCC standby) indicated by B2 are displayed. When play duration of the first dynamic information reaches a first play-duration threshold (for example, 3 seconds), the first dynamic information is stowed, and the first available-state icon is retained.

3. Jump from the Manual Driving State to an NOA Standby Driving State.

For example, for ease of understanding, FIG. 7*c* is a schematic diagram of jumping from a manual driving state to a navigate-on-autopilot driving state according to an embodiment of the present disclosure. As shown in (A) of FIG. 7*c*, a "state 1" is a manual driving state, and a "state 2" is that both an ACC driving state and an NOA driving state can be activated (ACC/NOA standby). Based on this, referring to (B) of FIG. 7*c*, there is no state prompt in the "state 1". When the "state 1" jumps to the "state 2" over time, a first available-state icon (namely, an NOA standby icon) indicated by C1 and first dynamic information (namely, dynamic information of NOA standby) indicated by C2 are displayed. When play duration of the first dynamic information reaches a first play-duration threshold (for example, 3 seconds), the first dynamic information is stowed, and the first available-state icon is retained.

Figure 8:
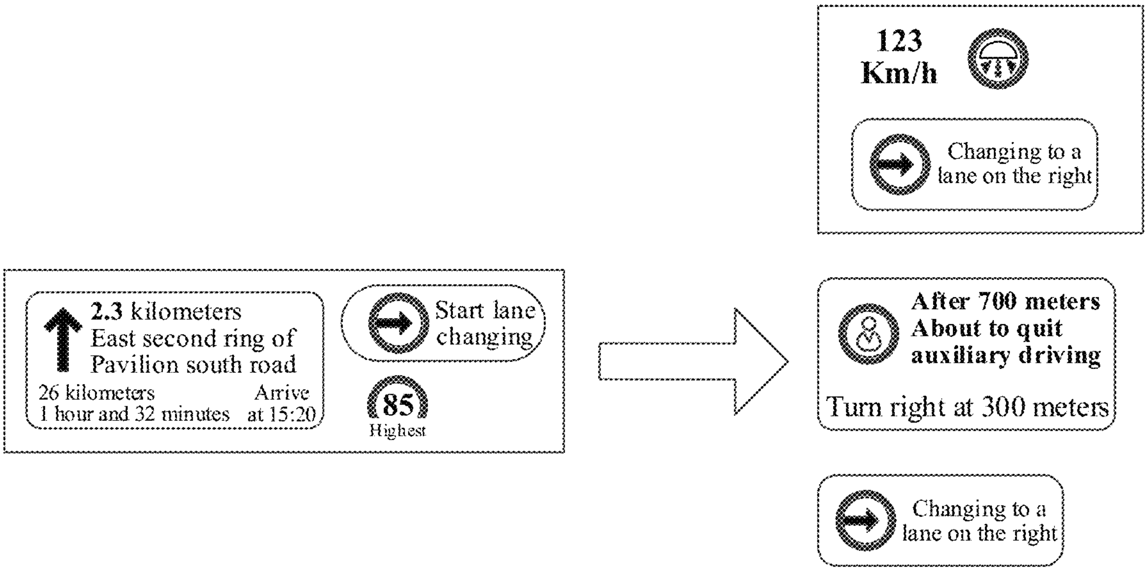
FIG. 8 is a schematic diagram of separating and displaying static information and dynamic information according to an embodiment of the present disclosure.

The icon, a display sequence, and prompt content may be updated based on iterations of product requirements. FIG. 8 is a schematic diagram of separating and displaying static information and dynamic information according to an embodiment of the present disclosure. As shown in FIG. 8, the static information and the dynamic information may be separated. The static information displays only an autonomous driving state. However, dynamic prompt animation is combined with a text and an induction panel.

Next, in this embodiment of the present disclosure, the manner of playing the dynamic message based on the standby state is provided. In the foregoing manner, based on guidance of the dynamic information and the static information, a user is provided with a more intuitive driving-state change by combining the dynamic information and the static information, to ensure that the user can learn a latest driving state. The user can be quickly familiar with an operation of the autonomous driving system, and a higher-dimensional information revelation capability is provided, thereby improving quality perception of the autonomous driving system.

Based on the foregoing embodiments corresponding to FIG. 4, in another embodiment of the present disclosure, the display method may further include:

playing second dynamic information on the driving interface if the target vehicle is switched to the second driving state, where the second dynamic information is configured for prompting that the vehicle is in the second driving state; and canceling playing the second dynamic information on the driving interface when play duration of the second dynamic information reaches a second play-duration threshold.

In various embodiments, a manner of playing a dynamic message based on an active state is described. It can be learned from the foregoing embodiments that the second dynamic information may further be played if the target vehicle is switched to the second driving state. Based on this, the user may learn, in time based on the second dynamic information, that the target vehicle has entered the second driving state. The second stable-state icon is a static icon, but the second dynamic information is a toast.

For ease of understanding, referring to FIG. 6 again, as shown in the figure, the driving state jumps from the "state 1" to the "state 2" over time, and the second dynamic information and the second stable-state icon start to be represented immediately at the jump. When the play duration of the second dynamic information reaches the second play-duration threshold, the playing of the second dynamic information is canceled on the driving interface. To be specific, the second dynamic information is stowed, and only the second stable-state icon is retained. A process of jumping from the manual driving state to another driving state is described below with reference to the drawings. The second play-duration threshold may be set in advance based on a requirement. The second play-duration threshold may be the same as or different from the first play-duration threshold. When the second play-duration threshold is the same as the first play-duration threshold, the second play-duration threshold may be, for example, 3 seconds. A value of the second play-duration threshold is not limited in this embodiment of the present disclosure.

1. Jump from the Manual Driving State to an ACC Active Driving State.

Figure 9A:
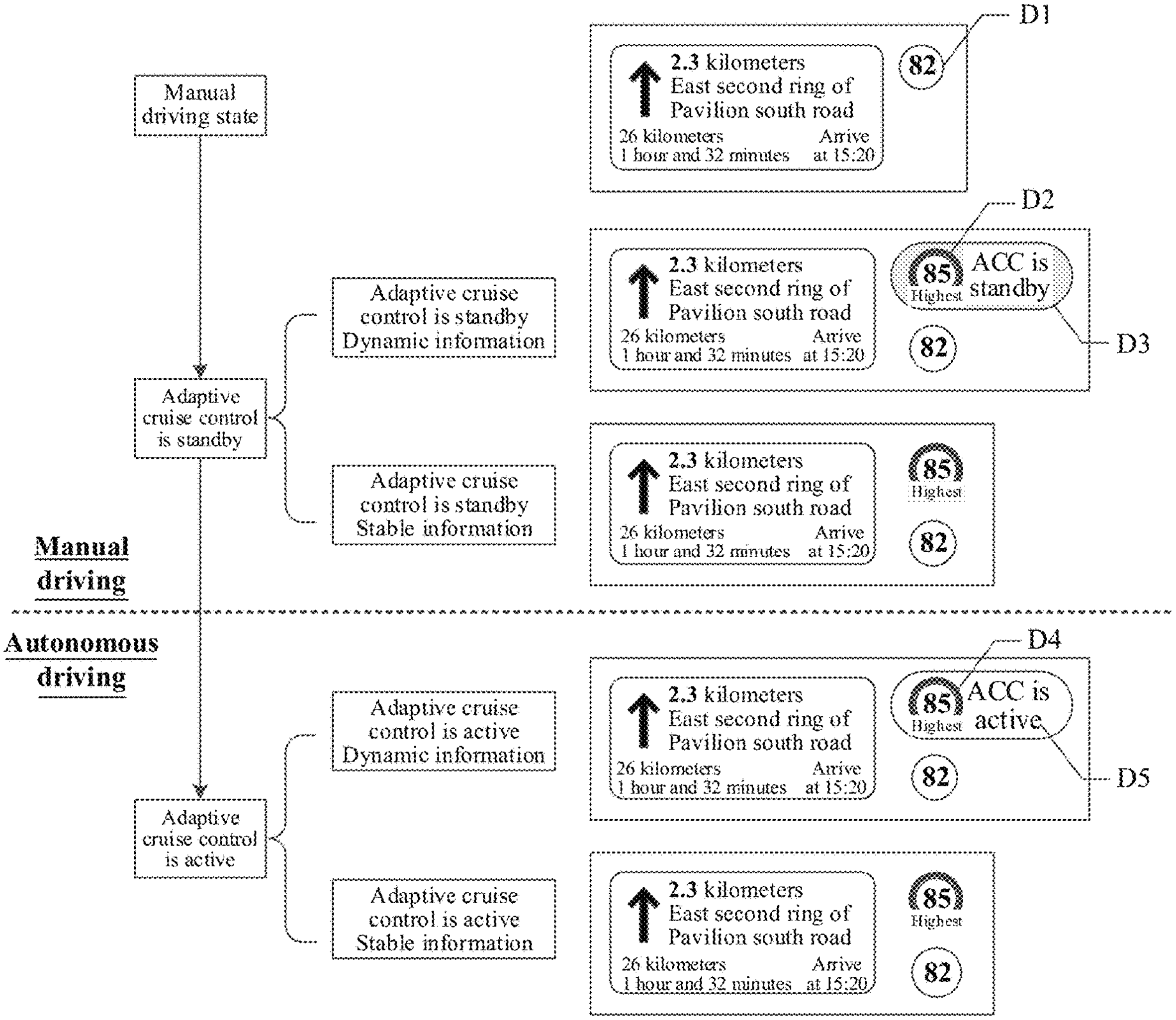
FIG. 9*a* is a schematic diagram of an activating process of an adaptive-cruise-control driving state according to an embodiment of the present disclosure.

For example, for ease of understanding, FIG. 9*a* is a schematic diagram of an activating process of an adaptive-cruise-control driving state according to an embodiment of the present disclosure. As shown in the figure, D1 is configured for indicating a first stable-state icon. In this case, a first driving state is the "manual driving state". When the manual driving state jumps to an ACC standby driving state (ACC standby), a first available-state icon (namely, an ACC standby icon) indicated by D2 and first dynamic information (namely, dynamic information of ACC standby) indicated by D3 are displayed. When play duration of the first dynamic information reaches a first play-duration threshold, the first dynamic information is stowed, and the first available-state icon is retained. When the target vehicle is switched to a second driving state (namely, an ACC driving state), a second stable-state icon (namely, an ACC active icon) indicated by D4 and second dynamic information (namely, dynamic information of ACC active) indicated by D5 are displayed. When play duration of the second dynamic information reaches a second play-duration threshold, the second dynamic information is stowed, and the second stable-state icon is retained.

2. Jump from the Manual Driving State to an LCC Active Driving State.

Figure 9B:
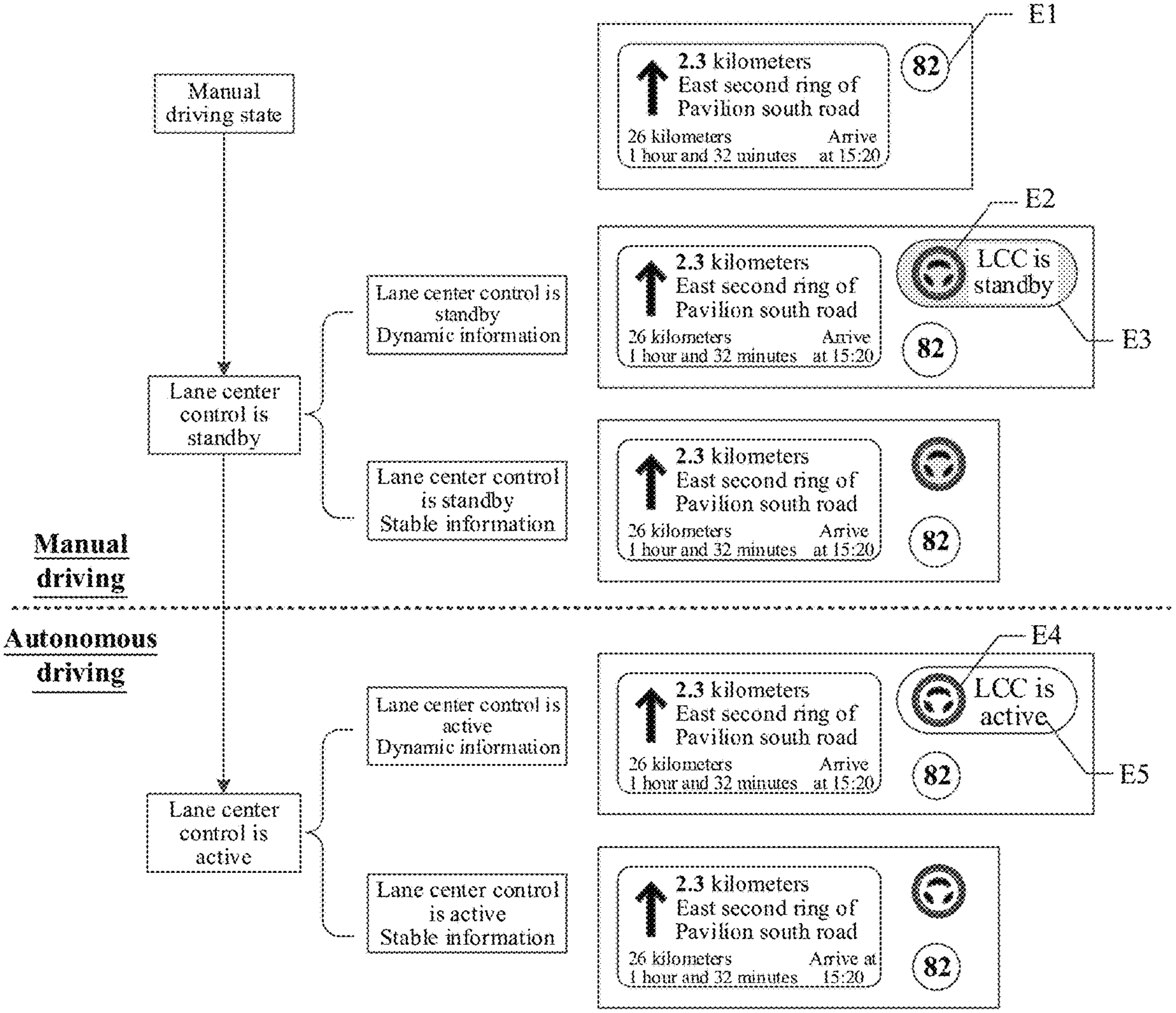
FIG. 9*b* is a schematic diagram of an activating process of a lane-center-control driving state according to an embodiment of the present disclosure.

For example, for ease of understanding, FIG. 9*b* is a schematic diagram of an activating process of a lane-center-control driving state according to an embodiment of the present disclosure. As shown in the figure, E1 is configured for indicating a first stable-state icon. In this case, a first driving state is the "manual driving state". When the manual driving state jumps to a state that both an ACC driving state and an LCC driving state can be activated (ACC/LCC standby), a first available-state icon (namely, an LCC standby icon) indicated by E2 and first dynamic information (namely, dynamic information of LCC standby) indicated by E3 are displayed. When play duration of the first dynamic information reaches a first play-duration threshold, the first dynamic information is stowed, and the first available-state icon is retained. When the target vehicle is switched to a second driving state (namely, an LCC driving state), a second stable-state icon (namely, an LCC active icon) indicated by E4 and second dynamic information (namely, dynamic information of LCC active) indicated by E5 are displayed. When play duration of the second dynamic information reaches a second play-duration threshold, the second dynamic information is stowed, and the second stable-state icon is retained.

3. Jump from the Manual Driving State to an NOA Active Driving State.

For example, for ease of understanding, FIG. 9*c* is a schematic diagram of an activating process of a navigate-on-autopilot driving state according to an embodiment of the present disclosure. As shown in the figure, F1 is configured for indicating a first stable-state icon. In this case, a first driving state is the "manual driving state". When the manual driving state jumps to a state that both an ACC driving state and an NOA driving state can be activated (ACC/NOA standby), a first available-state icon (namely, an NOA standby icon) indicated by F2 and first dynamic information (namely, dynamic information of NOA standby) indicated by F3 are displayed. When play duration of the first dynamic information reaches a first play-duration threshold, the first dynamic information is stowed, and the first available-state icon is retained. When the target vehicle is switched to a second driving state (namely, an NOA driving state), a second stable-state icon (namely, an NOA active icon) indicated by F4 and second dynamic information (namely, dynamic information of NOA active) indicated by F5 are displayed. When play duration of the second dynamic information reaches a second play-duration threshold, the second dynamic information is stowed, and the second stable-state icon is retained.

Usually, only one piece of dynamic information is displayed during each time of state jump. Presentation of the active state is prior to presentation of the standby state. The dynamic information is mainly for the active state and the standby state, and quit information may not be dynamically expanded.

Next, in this embodiment of the present disclosure, the manner of playing the dynamic message based on the active state is provided. In the foregoing manner, based on guidance of the dynamic information and the static information, a user is provided with a more intuitive driving-state change by combining the dynamic information and the static information, to ensure that the user can learn a latest driving state. The user can be quickly familiar with an operation of the autonomous driving system, and a higher-dimensional information revelation capability is provided, thereby improving quality perception of the autonomous driving system.

Based on the foregoing embodiments corresponding to FIG. 4, in another embodiment of the present disclosure, after the first available-state icon is displayed in the driving interface when the driving-state switching condition is satisfied, the display method may further include:

displaying a third stable-state icon on the driving interface if the target vehicle is switched to a third driving state, where the third stable-state icon is configured for prompting that the vehicle is in the third driving state.

In various embodiments, a manner of actively switching to the third driving state by a user is described. It can be learned from the foregoing embodiments that, if a plurality of driving states can be currently supported, a highest-level driving state is preferentially displayed. Based on this, the user is allowed to manually switch to a lower-level driving state. With reference to the state jump logic of the autonomous driving shown in FIG. 1, in the present disclosure, switching of the following driving states may be supported.

(1) The first driving state is the manual driving state, and the second driving state is the LCC driving state. In this case, the first available-state icon indicates that the target vehicle can currently activate the LCC driving state (that is, LCC Standby). When the third driving state (namely, the ACC driving state) is switched to, third dynamic information (namely, dynamic information of ACC active) and the third stable-state icon (namely, an ACC active icon) may be displayed.

(2) The first driving state is the manual driving state, and the second driving state is the NOA driving state. In this case, the first available-state icon indicates that the target vehicle can currently activate the NOA driving state (that is, NOA Standby). When the third driving state (namely, the ACC driving state) is switched to, third dynamic information (namely, dynamic information of ACC active) and the third stable-state icon (namely, an ACC active icon) may be displayed.

(3) The first driving state is the manual driving state, and the second driving state is the NOA driving state. In this case, the first available-state icon indicates that the target vehicle can currently activate the NOA driving state (that is, NOA Standby). When the third driving state (namely, the LCC driving state) is switched to, third dynamic information (namely, dynamic information of LCC active) and the third stable-state icon (namely, an LCC active icon) may be displayed.

(4) The first driving state is the ACC driving state, and the second driving state is the NOA driving state. In this case, the first available-state icon indicates that the target vehicle can currently activate the NOA driving state (that is, NOA Standby). When the third driving state (namely, the LCC driving state) is switched to, third dynamic information (namely, dynamic information of LCC active) and the third stable-state icon (namely, an LCC active icon) may be displayed.

Next, in this embodiment of the present disclosure, the manner of actively switching to the third driving state by the user is provided. In the foregoing manner, if the target vehicle can currently support a plurality of driving states, the highest-level driving state may be preferentially displayed. In this case, the user is still supported to manually switch to the lower-level driving state. Therefore, feasibility and flexibility of the solution are improved.

Based on the foregoing embodiments corresponding to FIG. 4, in another embodiment of the present disclosure, the first driving state is a manual driving state, the second driving state is a lane-center-control driving state, and the third driving state is an adaptive-cruise-control driving state.

Alternatively, the first driving state is a manual driving state, the second driving state is a navigate-on-autopilot driving state, and the third driving state is an adaptive-cruise-control driving state.

Alternatively, the first driving state is a manual driving state, the second driving state is a navigate-on-autopilot driving state, and the third driving state is a lane-center-control driving state.

Alternatively, the first driving state is an adaptive-cruise-control driving state, the second driving state is a navigate-on-autopilot driving state, and the third driving state is a lane-center-control driving state.

In various embodiments, a plurality of switchable driving-state types are described. It can be learned from the foregoing embodiments that, before function upgrading is implemented, a corresponding prompt of a driving-state change may be provided by using the driving interface. If a plurality of driving states can be currently supported, a highest-level driving state is preferentially displayed. Based on this, a level of the third driving state is higher than a level of the first driving state, and the level of the third driving state is lower than a level of the second driving state.

Again, in the embodiments of the present disclosure, a plurality of switchable driving-state types are provided. In the foregoing manner, switching can be implemented between the manual driving state, the ACC driving state, the LCC driving state, and the NOA driving state, thereby improving flexibility and feasibility of the solution.

Based on the foregoing embodiments corresponding to FIG. 4, in another embodiment of the present disclosure, the display method may further include:

voice-playing a state-activating message if the target vehicle is switched to the second driving state, where the state-activating message is configured for prompting that the target vehicle is in the second driving state.

Alternatively, the display method may further include:

in a process of voice-playing a to-be-played message, if the target vehicle is switched to the second driving state, switching the to-be-played message to a state-activating message, where a play priority corresponding to the state-activating message is higher than a play priority corresponding to the to-be-played message.

Alternatively, the display method may further include:

in a process of voice-playing a to-be-played message, if the target vehicle is switched to the second driving state, voice-playing a state-activating message after the playing of the to-be-played message ends, where a play priority corresponding to the to-be-played message is higher than a play priority corresponding to the state-activating message.

In various embodiments, a TTS broadcasting method when a driving state is activated is described. It can be known from the foregoing embodiments that the state-activating message may be further voice-played if the target vehicle is switched to the second driving state. Speech broadcasting refers to broadcasting state-change information by voice or through speeching when a state changes. Based on this, the user may learn, in time based on the state-activating message, that the target vehicle has entered the second driving state.

In one embodiment, when the target vehicle is switched to the second driving state, the state-activating message may be directly voice-played. For example, if the target vehicle is switched to the ACC driving state, the state-activating message may be "ACC active". In another case, whether the to-be-played message needs to be played currently further needs to be determined, and speech broadcasting is performed based on a priority of the to-be-played message and a priority of the state-activating message.

For ease of understanding, FIG. 10 is a schematic flowchart of speech broadcast processing according to an embodiment of the present disclosure. As shown in the figure, broadcast content of switching of an autonomous driving state (namely, the state-activating message) and broadcast content of road induction (namely, the to-be-played message) are inputted to a TTS arbitration module, and the TTS arbitration module checks whether there is content currently broadcast and whether there is new broadcast content. If the to-be-played message is currently broadcast, the priority of the to-be-played message and the priority of the state-activating message are checked. If the priority of the state-activating message is higher, the currently broadcast to-be-played message is interrupted, and the voice-played to-be-played message is switched to the state-activating message. If the priority of the state-activating message is lower, the to-be-played message continues to be broadcast and the state-activating message is ignored. After the playing of the to-be-played message ends, the state-activating message may be voice-played. If the broadcast content of the autonomous driving and the broadcast content of the road induction are received simultaneously, priorities of the content are compared, and content with a higher priority is preferentially broadcast.

After receiving output content from the TTS arbitration module, a TTS broadcasting module directly broadcasts the output content. A vehicle-mounted system plays sound through a vehicle-mounted speaker based on a status of an audio device of a real vehicle, or outputs the sound to the user through a Bluetooth headset.

Next, in this embodiment of the present disclosure, the TTS broadcasting method when the driving state is activated is provided. In the foregoing manner, when an original state jumps to a target state, not only a state icon can be displayed, but also a state change can be reported through the TTS. In this way, perception of the user for the autonomous driving state can be further enhanced with reference to the speech broadcast.

Based on the foregoing embodiments corresponding to FIG. 4, in another embodiment of the present disclosure, after the second stable-state icon is displayed on the driving interface, the display method may further include:

updating the second stable-state icon to a second available-state icon if the target vehicle quits the second driving state, where the second available-state icon is configured for prompting that the target vehicle can activate a corresponding driving state.

Alternatively, after the second stable-state icon is displayed on the driving interface, the display method may further include:

canceling displaying the second stable-state icon on the driving interface if the target vehicle quits the second driving state.

In various embodiments, a manner of prompting based on a quit driving state is described. It can be learned from the foregoing embodiments that, if the target vehicle quits the second driving state, a state to which the target vehicle can quit further needs to be determined by using the autonomous driving system. In one case, the target vehicle may quit from an active state to a standby state. In another case, the target vehicle may directly quit the autonomous driving state, and display of the second stable-state icon is canceled. An example in which the second driving state is the ACC driving state is used for description below.

Figure 11:
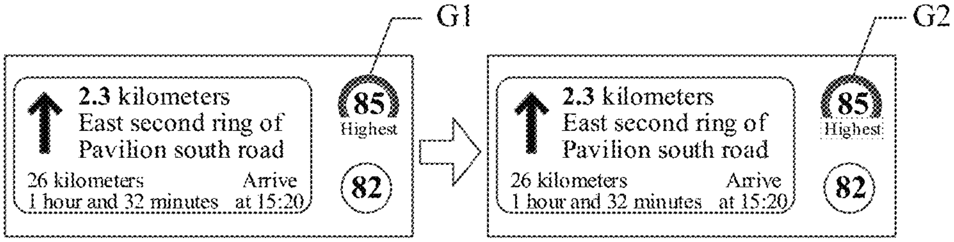
FIG. 11 is a schematic diagram of quitting a second driving state according to an embodiment of the present disclosure.

For example, for ease of understanding, FIG. 11 is a schematic diagram of quitting a second driving state according to an embodiment of the present disclosure. As shown in the figure, G1 is configured for indicating a second stable-state icon (namely, an ACC active icon). It is detected that the target vehicle quits the second driving state, and the autonomous driving system determines that the ACC driving state can still be activated. Based on this, a second available-state icon (namely, an ACC standby icon) indicated by G2 is displayed.

Figure 12:
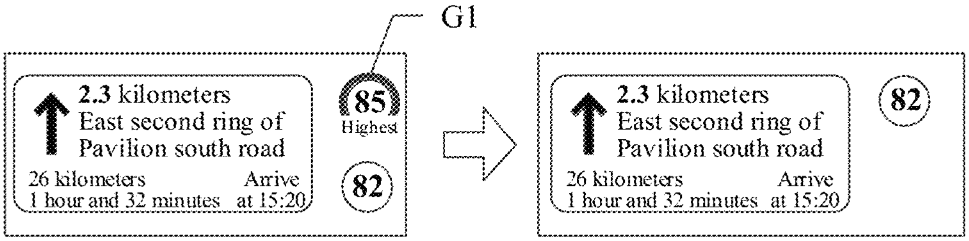
FIG. 12 is another schematic diagram of quitting a second driving state according to an embodiment of the present disclosure.

For example, for ease of understanding, FIG. 12 is another schematic diagram of quitting a second driving state according to an embodiment of the present disclosure. As shown in the figure, G1 is configured for indicating a second stable-state icon (namely, an ACC active icon). It is detected that the target vehicle quits the second driving state, and the autonomous driving system determines that autonomous driving is not suitable to be continued. Based on this, the second stable-state icon is no longer displayed.

Next, in this embodiment of the present disclosure, the manner of prompting based on the quit driving state is provided. In the foregoing manner, prompting may also be performed when a driving state is quit, to facilitate timely perception of the user, thereby helping improve driving safety.

Based on the foregoing embodiments corresponding to FIG. 4, in another embodiment of the present disclosure, the display method may further include:

voice-playing a state-quitting message if the target vehicle quits the second driving state, where the state-quitting message is configured for prompting that the target vehicle quits the second driving state.

Alternatively, the display method may further include:

in a process of voice-playing a to-be-played message, if the target vehicle quits the second driving state, switching the to-be-played message that is voice-played to a state-quitting message, where a play priority corresponding to the state-quitting message is higher than a play priority corresponding to the to-be-played message.

Alternatively, the display method may further include:

in a process of voice-playing a to-be-played message, if the target vehicle quits the second driving state, voice-playing a state-quitting message after the playing of the to-be-played message ends, where a play priority corresponding to the to-be-played message is higher than a play priority corresponding to the state-quitting message.

In various embodiments, a TTS broadcasting method when a driving state is quit is described. It can be learned from the foregoing embodiments that the state-quitting message may be further voice-played if the target vehicle quits the second driving state. Speech broadcasting refers to broadcasting state-change information by voice or through speech when a state changes. Based on this, the user may learn, in time based on the state-quitting message, that the target vehicle has quit the second driving state.

In one embodiment, when the target vehicle is switched to the second driving state, the state-quitting message may be directly voice-played. For example, if the ACC driving state is quit, the state-quitting message may be "ACC quit". In another case, whether the to-be-played message needs to be played currently further needs to be determined, and speech broadcasting is performed based on a priority of the to-be-played message and a priority of the state-quitting message.

For ease of understanding, referring to FIG. 10 again, as shown in the figure, broadcast content of switching of an autonomous driving state (namely, the state-quitting message) and broadcast content of road induction (namely, the to-be-played message) are inputted to the TTS arbitration module, and the TTS arbitration module checks whether there is content currently broadcast and whether there is new broadcast content. If the to-be-played message is currently broadcast, the priority of the to-be-played message and the priority of the state-quitting message are checked. If the priority of the state-quitting message is higher, the currently broadcast to-be-played message is interrupted, and the to-be-played message that is voice-played is switched to the state-quitting message. If the priority of the state-quitting message is lower, the to-be-played message continues to be broadcast and the state-quitting message is ignored. After the playing of the to-be-played message ends, the state-quitting message may be voice-played. If the broadcast content of the autonomous driving and the broadcast content of the road induction are received simultaneously, priorities of the content are compared, and content with a higher priority is preferentially broadcast.

After receiving output content from the TTS arbitration module, a TTS broadcasting module directly broadcasts the output content. A vehicle-mounted system plays sound through a vehicle-mounted speaker based on a status of an audio device of a real vehicle, or outputs the sound to the user through a Bluetooth headset.

Next, in this embodiment of the present disclosure, the TTS broadcasting method when the driving state is quit is provided. In the foregoing manner, prompting may further be performed through the TTS when the autonomous driving state is quit. Perception of the user for the autonomous driving state can be further enhanced with reference to the speech broadcast, thereby helping improve driving safety.

Based on the foregoing embodiments corresponding to FIG. 4, in another embodiment of the present disclosure, the display method may further include:

- displaying, on a speech setting interface in response to a speech setting instruction, a download control and a preview control that both correspond to a to-be-used tone;
- downloading an available speech in response to a selection operation for the download control, and displaying a use control corresponding to the to-be-used tone;
- in response to a selection operation for the use control, using the to-be-used tone as a tone for voice-playing; and
- in response to a selection operation for the preview control, voice-playing a preset text using the to-be-used tone.

In various embodiments, a manner of supporting the user in customizing a TTS sound effect is described. It can be learned from the foregoing embodiments that TTS broadcasting may further be performed when the driving state is activated or the driving state is quit. The TTS broadcasting module uses a system tone by default to perform speech broadcast, and a plurality of special topic speeches are also provided for the user to select.

Figure 13:
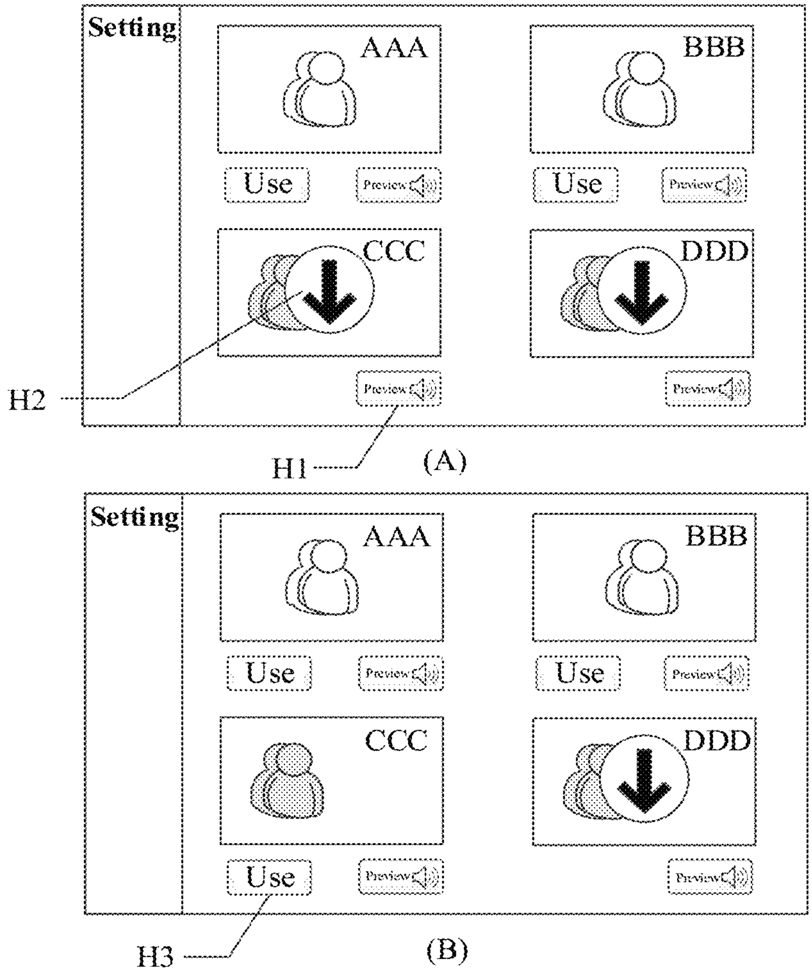
FIG. 13 is a schematic diagram of a speech setting interface according to an embodiment of the present disclosure.

For ease of understanding, FIG. 13 is a schematic diagram of a speech setting interface according to an embodiment of the present disclosure. When the user triggers a speech setting instruction, a speech setting interface shown in (A) of FIG. 13 is displayed. For example, a to-be-used tone is a tone of a virtual character "CCC". H1 is configured for indicating a preview control, and H2 is configured for indicating a download control. If the user taps the preview control indicated by H1, a selection operation for the preview control is triggered. In this case, a preset text (for example, a driving state is switched) is voice-played using the tone of the virtual character "CCC". If the user taps the download control indicated by H2, a selection operation for the download control is triggered. In this case, an available speech corresponding to the to-be-used tone is downloaded. After downloading is completed, an interface shown in (B) of FIG. 13 is displayed. H3 is configured for indicating a use control. If the user taps the use control indicated by H3, a selection operation for the use control is triggered. In this case, the to-be-used tone is used as a tone for voice-playing.

The special TTS speech broadcast may be replaced with other speech broadcast. Only a made tone changes, and an entire broadcast form is not affected. In addition to an original broadcast text involved in the present disclosure, broadcast content may alternatively be optimized and replaced based on a broadcasting role and a broadcasting scenario. This is not limited herein.

In various embodiments, the manner of supporting the user in customizing the TTS sound effect is provided. In the foregoing manner, the special TTS speech broadcast may be used, so that sound and light are combined to provide the user with immersive experience of sensing the autonomous driving state. Meanwhile, the special TTS speech broadcast is used, so that strangeness of the autonomous driving system to the user is reduced, and the user is closer to the autonomous driving system.

Based on the foregoing embodiments corresponding to FIG. 4, in another embodiment of the present disclosure, the first driving state is a manual driving state.

The displaying the first stable-state icon on the driving interface may specifically include:

- displaying the first stable-state icon and a lane back map on the driving interface, where the lane back map includes at least one lane, and the at least one lane includes a target lane on which the target vehicle is located.

A presentation form of the target lane includes at least one of the following:

- highlighting the target lane;
- displaying a lane line of the target lane; and
- displaying a driving guide line.

In various embodiments, a manner of rendering the vehicle based on the manual driving state is described. It can be learned from the foregoing embodiments that, during traveling of the vehicle, the driving state may be presented to the user. The driving interface is different in different driving states. Descriptions are provided below by using an example in which the current driving state of the target vehicle is the manual driving state.

Figure 14:
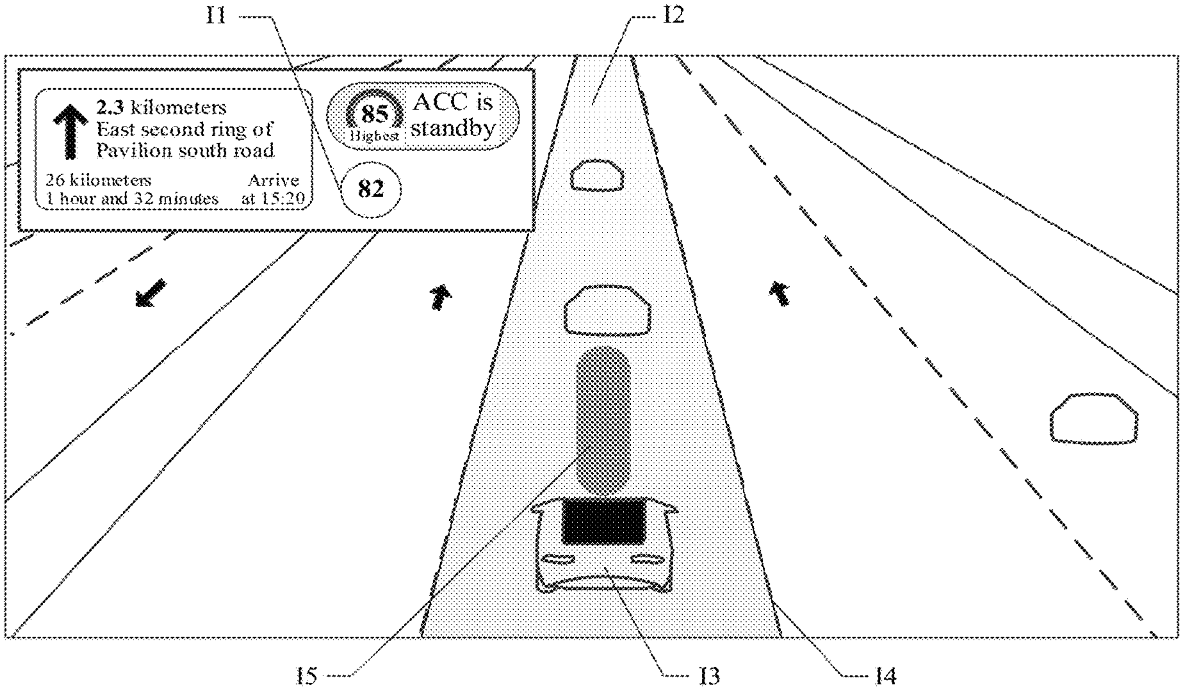
FIG. 14 is a schematic diagram of a driving interface that is based on a manual driving state according to an embodiment of the present disclosure.

For ease of understanding, FIG. 14 is a schematic diagram of a driving interface that is based on a manual driving state according to an embodiment of the present disclosure. As shown in the figure, I1 is configured for indicating a first stable-state icon (in other words, the manual driving state is activated). Meanwhile, at least one lane is displayed in a lane back map. A lane on which the target vehicle is currently located is a target lane. I2 is configured for indicating the target lane, and the target lane may be highlighted. I3 is configured for indicating the target vehicle. I4 is configured for indicating a lane line of the target lane. I5 is configured for indicating a driving guide line.

Next, in this embodiment of the present disclosure, the manner of rendering the vehicle based on the manual driving state is provided. In the foregoing manner, perception and understanding of the user for the autonomous driving state can be enhanced from three aspects. To be specific, the autonomous driving state is presented on the HMI, an operation of the autonomous driving system and a vehicle traveling status are rendered, and an operating status of the autonomous driving system is jointly expressed in combination with the speech broadcast.

Based on the foregoing embodiments corresponding to FIG. 4, in another embodiment of the present disclosure, the second driving state is an adaptive-cruise-control driving state.

The displaying the second stable-state icon on the driving interface may specifically include:

displaying the second stable-state icon and a lane back map on the driving interface, where the lane back map includes at least one lane, and the at least one lane includes a target lane on which the target vehicle is located.

A presentation form of the target lane includes at least one of the following:

displaying a radar wave corresponding to the target vehicle on the target lane;

highlighting the target lane;

displaying a lane line of the target lane; and displaying a driving guide line.

In various embodiments, a manner of rendering the vehicle based on the ACC driving state is described. It can be learned from the foregoing embodiments that, during traveling of the vehicle, the driving state may be presented to the user. The driving interface is different in different driving states. Descriptions are provided below by using an example in which the current driving state of the target vehicle is the ACC driving state.

Figure 15:
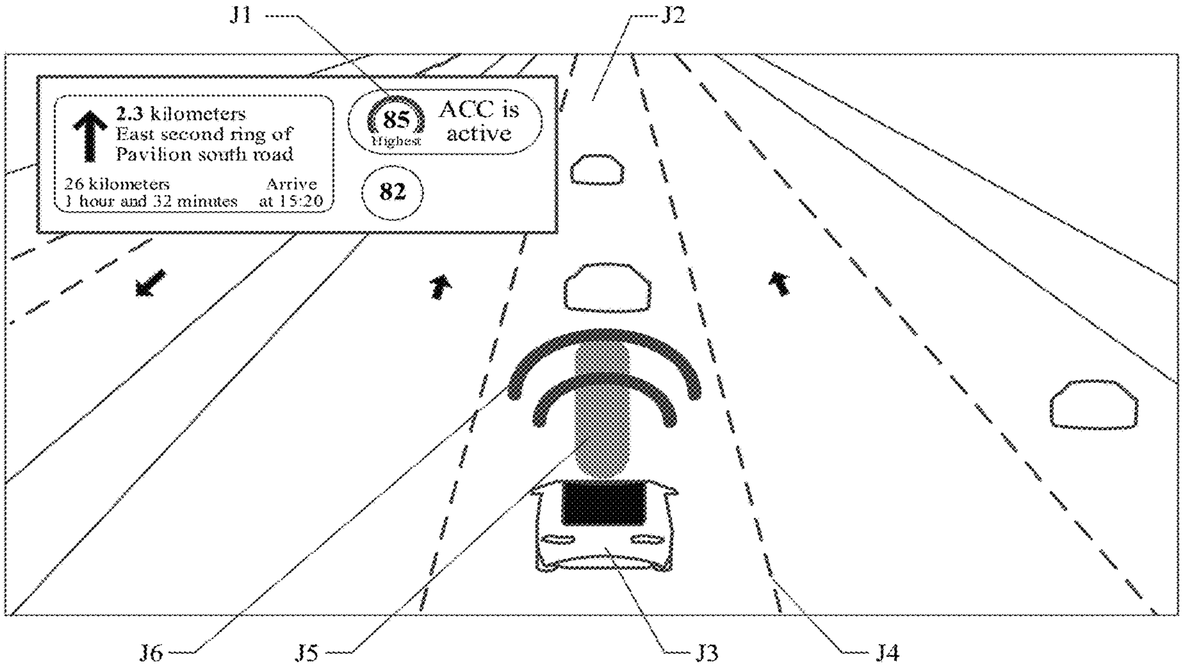
FIG. 15 is a schematic diagram of a driving interface that is based on an adaptive-cruise-control driving state according to an embodiment of the present disclosure.

For ease of understanding, FIG. 15 is a schematic diagram of a driving interface that is based on an adaptive-cruise-control driving state according to an embodiment of the present disclosure. As shown in the figure, J1 is configured for indicating a second stable-state icon (in other words, the ACC driving state is activated). Before the second stable-state icon is displayed, second dynamic information may further be played. In other words, the user is prompted, in a toast manner, that the ACC driving state is switched to. In addition, a state-activating message that "ACC is activated" may further be voice-broadcast. At least one lane is displayed in a lane back map shown in the figure. A lane on which the target vehicle is currently located is a target lane. J2 is configured for indicating the target lane, and the target lane may be highlighted. J3 is configured for indicating the target vehicle. J4 is configured for indicating a lane line of the target lane. J5 is configured for indicating a driving guide line. J6 is configured for indicating a special effect of a radar wave diverging from the target vehicle.

If the ACC driving state is quit, a state-quitting message that "ACC can be quit" may be audio-broadcast.

Next, in this embodiment of the present disclosure, the manner of rendering the vehicle based on the ACC driving state is provided. In the foregoing manner, perception and understanding of the user for the autonomous driving state can be enhanced from three aspects. To be specific, the autonomous driving state is presented on the HMI, an operation of the autonomous driving system and a vehicle traveling status are rendered, and an operating status of the autonomous driving system is jointly expressed in combination with the speech broadcast.

Based on the foregoing embodiments corresponding to FIG. 4, in another embodiment of the present disclosure, the second driving state is a lane-center-control driving state.

The displaying the second stable-state icon on the driving interface may specifically include:

displaying the second stable-state icon and a lane back map on the driving interface, where the lane back map includes at least one lane, and the at least one lane includes a target lane on which the target vehicle is located.

A presentation form of the target lane includes at least one of the following:

highlighting the target lane;

displaying a lane line of the target lane; and displaying a driving guide line.

In various embodiments, a manner of rendering the vehicle based on the LCC driving state is described. It can be learned from the foregoing embodiments that, during traveling of the vehicle, the driving state may be presented to the user. The driving interface is different in different driving states. Descriptions are provided below by using an example in which the current driving state of the target vehicle is the LCC driving state.

Figure 16:
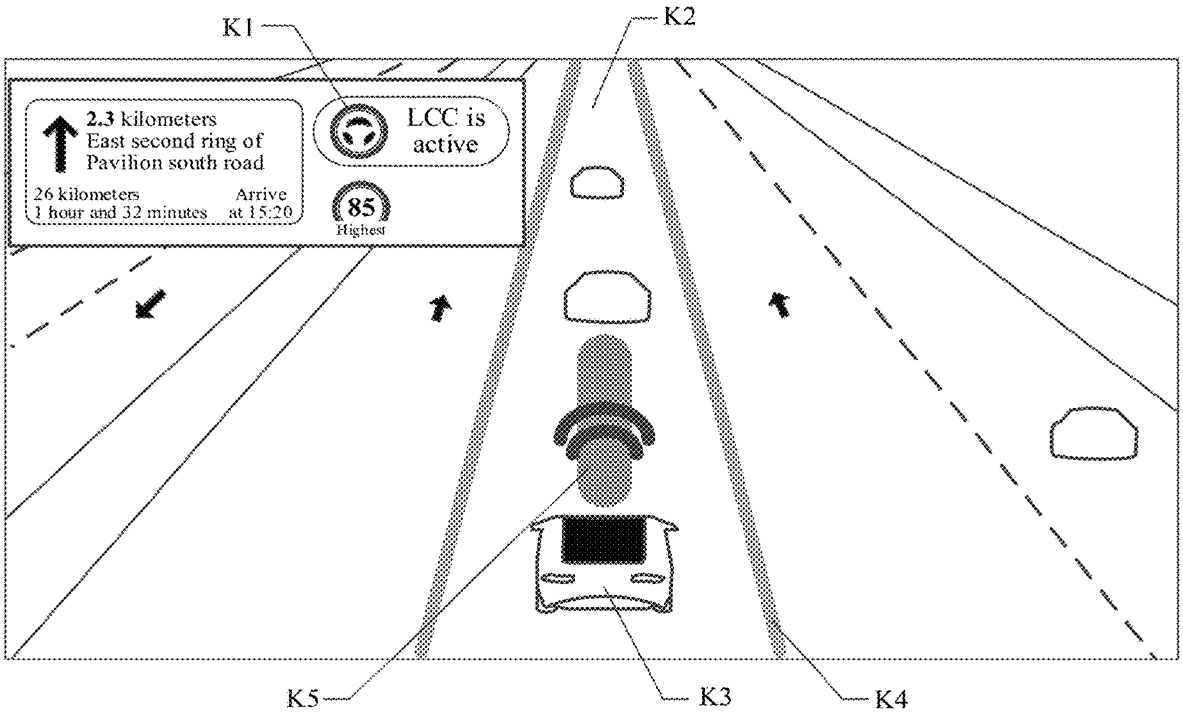
FIG. 16 is a schematic diagram of a driving interface that is based on a lane-center-control driving state according to an embodiment of the present disclosure.

For ease of understanding, FIG. 16 is a schematic diagram of a driving interface that is based on a lane-center-control driving state according to an embodiment of the present disclosure. As shown in the figure, K1 is configured for indicating a second stable-state icon (in other words, the LCC driving state is activated). Before the second stable-state icon is displayed, second dynamic information may further be played. In other words, the user is prompted, in a toast manner, that the LCC driving state is switched to. In addition, a state-activating message that "LCC is activated" may further be audio-broadcast. At least one lane is displayed in a lane back map shown in the figure. A lane on which the target vehicle is currently located is a target lane. K2 is configured for indicating the target lane, and the target lane may be highlighted. K3 is configured for indicating the target vehicle. K4 is configured for indicating a lane line of the target lane. K5 is configured for indicating a driving guide line.

If the LCC driving state is quit, a state-quitting message that "LCC can be quit" may be broadcast through speeching.

Next, in this embodiment of the present disclosure, the manner of rendering the vehicle based on the LCC driving state is provided. In the foregoing manner, perception and understanding of the user for the autonomous driving state can be enhanced from three aspects. To be specific, the autonomous driving state is presented on the HMI, an operation of the autonomous driving system and a vehicle traveling status are rendered, and an operating status of the autonomous driving system is jointly expressed in combination with the speech broadcast.

Based on the foregoing embodiments corresponding to FIG. 4, in another embodiment of the present disclosure, the second driving state is a navigate-on-autopilot driving state.

The displaying the second stable-state icon on the driving interface may specifically include:

displaying the second stable-state icon and a lane back map on the driving interface, where the lane back map includes at least two lanes, and the at least two lanes include a target lane on which the target vehicle is located.

A presentation form of the target lane includes at least one of the following:

displaying a first vehicle-falling point for the target vehicle on a to-be-changed lane;

displaying a second vehicle-falling point for the target vehicle on the to-be-changed lane, where positioning accuracy of the second vehicle-falling point is higher than positioning accuracy of the first vehicle-falling point;

highlighting the target lane;

displaying a lane line of the target lane; and displaying a driving guide line.

In various embodiments, a manner of rendering the vehicle based on the NOA driving state is described. It can be learned from the foregoing embodiments that, during traveling of the vehicle, the driving state may be presented to the user. The driving interface is different in different driving states. Descriptions are provided below by using an example in which the current driving state of the target vehicle is the NOA driving state. When the NOA driving state is activated, the user may be prompted, based on a change of a state of an icon, speech broadcast, and the driving guide line in the lane back map, that the NOA driving state is currently entered. In addition, the first vehicle-falling point may further be highlighted during autonomous lane changing based on the activated NOA driving state, and the second vehicle-falling point is prompted. The positioning accuracy of the second vehicle-falling point is higher than the positioning accuracy of the first vehicle-falling point. In other words, the second vehicle-falling point is an accurate vehicle-falling point, and the first vehicle-falling point is a normal vehicle-falling point.

Figure 17A:
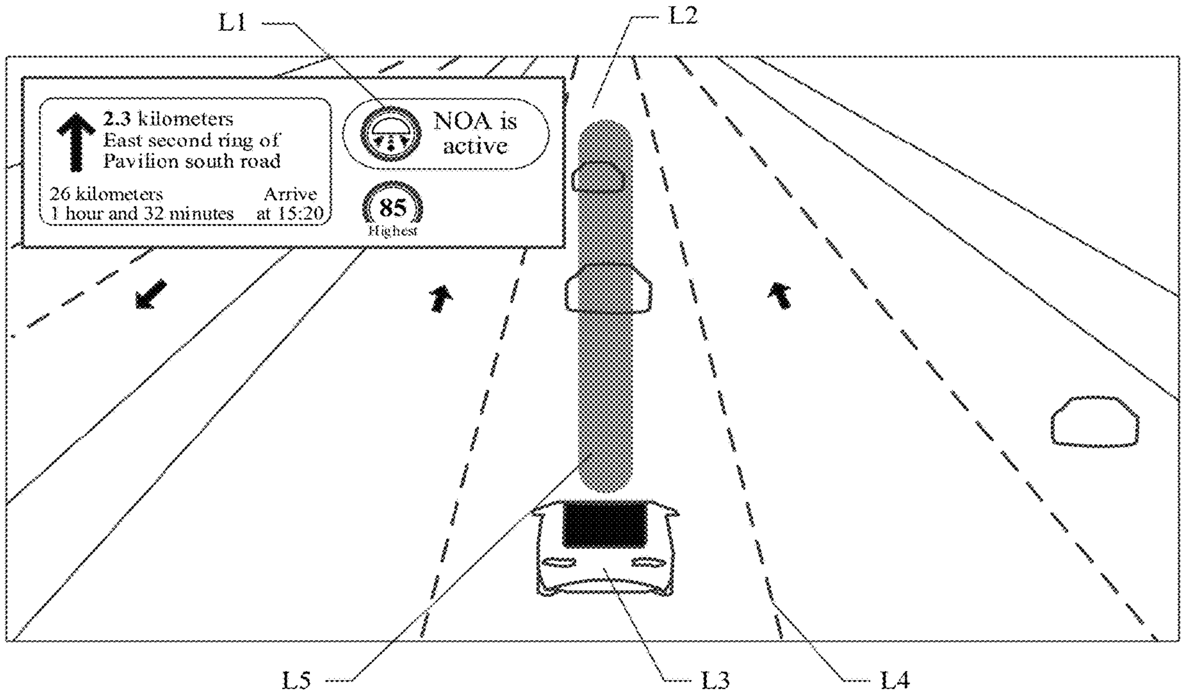
FIG. 17*a* is a schematic diagram of a driving interface that is based on a navigate-on-autopilot driving state according to an embodiment of the present disclosure.

For ease of understanding, FIG. 17*a* is a schematic diagram of a driving interface that is based on a navigate-on-autopilot driving state according to an embodiment of the present disclosure. As shown in the figure, L1 is configured for indicating a second stable-state icon (in other words, the NOA driving state is activated). Before the second stable-state icon is displayed, second dynamic information may further be played. In other words, the user is prompted, in a toast manner, that the NOA driving state is switched to. In addition, a state-activating message that "NOA is activated" may further be broadcast by audio. At least one lane is displayed in a lane back map shown in the figure. A lane on which the target vehicle is currently located is a target lane. L2 is configured for indicating the target lane. L3 is configured for indicating the target vehicle. L4 is configured for indicating a lane line of the target lane. L5 is configured for indicating a driving guide line.

If the NOA driving state is quit, a state-quitting message that "NOA can be quit" may be audio-broadcast.

Figure 17B:
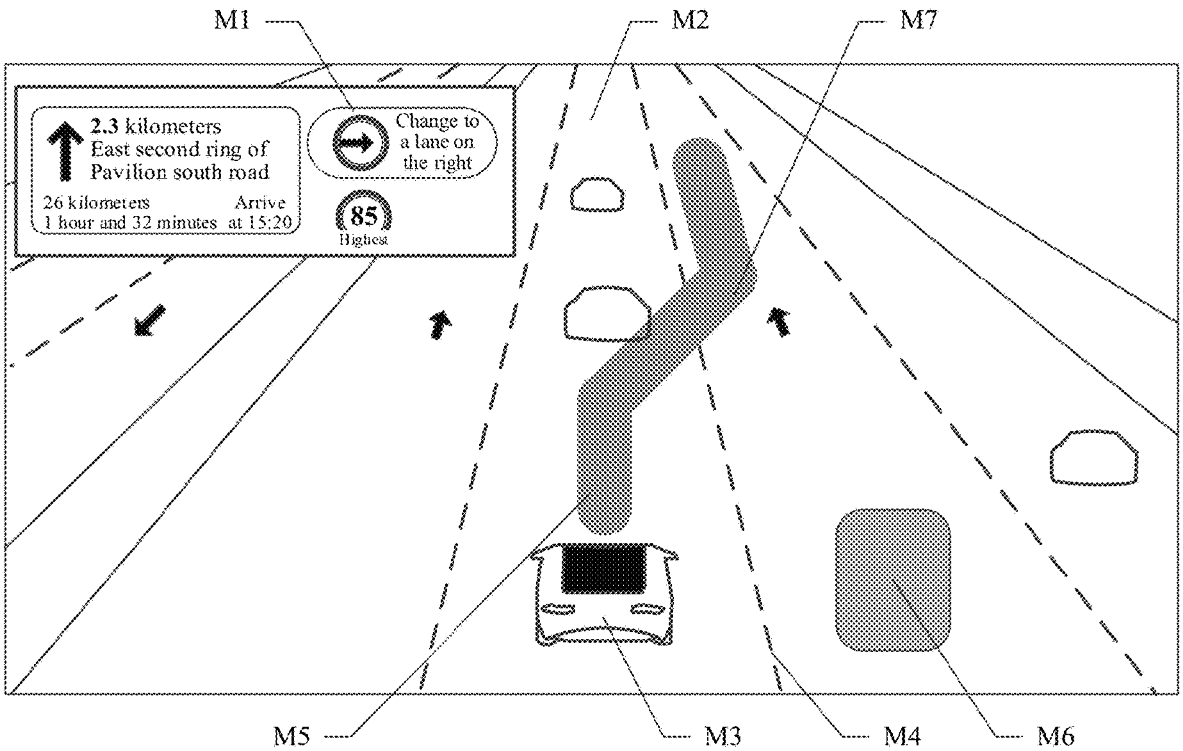
FIG. 17*b* is another schematic diagram of a driving interface that is based on a navigate-on-autopilot driving state according to an embodiment of the present disclosure.

In a case of autonomous lane changing, for ease of understanding, FIG. 17*b* is another schematic diagram of a driving interface that is based on a navigate-on-autopilot driving state according to an embodiment of the present disclosure. As shown in the figure, M1 is configured for indicating a second stable-state icon (in other words, the NOA driving state is activated). Meanwhile, at least one lane is displayed in a lane back map. A lane on which the target vehicle is currently located is a target lane. M2 is configured for indicating the target lane. M3 is configured for indicating the target vehicle. M4 is configured for indicating a lane line of the target lane. M5 is configured for indicating a driving guide line. M6 is configured for indicating a first vehicle-falling point for the target vehicle, and M7 is configured for indicating a second vehicle-falling point for the target vehicle.

Next, in this embodiment of the present disclosure, the manner of rendering the vehicle based on the NOA driving state is provided. In the foregoing manner, perception and understanding of the user for the autonomous driving state can be enhanced from three aspects. To be specific, the autonomous driving state is presented on the HMI, an operation of the autonomous driving system and a vehicle traveling status are rendered, and an operating status of the autonomous driving system is jointly expressed in combination with the speech broadcast.

When the target lane is represented, the target lane may be represented in a representation manner of the driving guide line. The driving guide line may be generated based on the lane center line. A manner of generating the driving guide line is described below. Based on the foregoing embodiments corresponding to FIG. 4, in another embodiment of the present disclosure, the display method may further include:

determining, from an X-axis provided by a coordinate system, T coordinate values belonging to a detection range corresponding to the target vehicle, where the coordinate system is constructed based on a location of the target vehicle, the X-axis points to a traveling direction of the target vehicle, and T is an integer greater than 1;

calculating T left-lane coordinates by using a left-lane curve equation based on the T coordinate values;

calculating T right-lane coordinates by using a right-lane curve equation based on the T coordinate values;

constructing a lane center line of the target lane based on the T left-lane coordinates and the T right-lane coordinates; and generating the driving guide line based on the lane center line of the target lane.

In various embodiments, a manner of calculating a lane boundary and the lane center line is described. It can be learned from the foregoing embodiments that data of a lane line originates from a sensing system of the autonomous driving system. The sensing system of the autonomous driving system usually includes a visual sensing result and a radar sensing result. The sensing system detects information about an environment around the self vehicle, such as a side vehicle, a pedestrian, a two-wheeled vehicle, and the lane line. The data of the lane line includes a lane line of a lane on which the target vehicle is located, a lane line of a side lane, and data of a lane line of a lane next to the side lane. Specifically, a quantity of pieces of data of lane lines depends on a capability of the sensing system. The data of the lane line outputted by the sensing system includes a curve equation of the lane line, a start point of the lane line, an end point of the lane line, a color of the lane line, a line type (for example, a solid line, a dashed line, or a chain line) of the lane line, and the like. The manner of calculating the lane center line and the driving guide line is described below.

Figure 18:
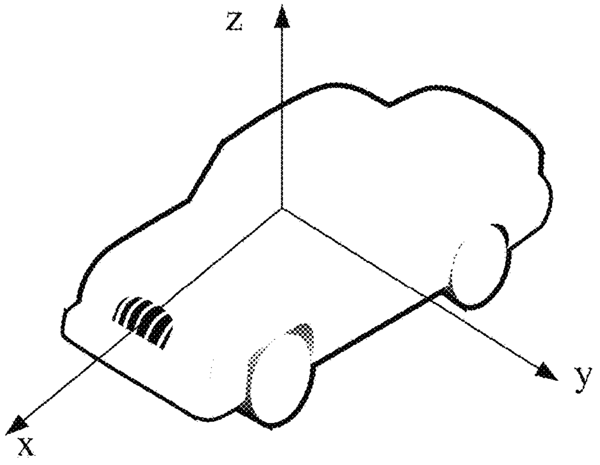
FIG. 18 is a schematic diagram of constructing a coordinate system based on a vehicle according to an embodiment of the present disclosure.

For ease of understanding, FIG. 18 is a schematic diagram of constructing a coordinate system based on a target vehicle according to an embodiment of the present disclosure. As shown in the figure, a coordinate system is constructed based on the target vehicle. A traveling direction of the target vehicle is an X-axis, a left side of the target vehicle is a Y-axis, and an upper side of the target vehicle is a Z-axis. Based on a detection range of the sensing system, a value range of T coordinates may be obtained as [startX, endX]. startX represents coordinates of a start point on the X-axis in the coordinate system, and endX represents coordinates of an end point on the X-axis in the coordinate system.

A first-order equation may be used to express a straight line in geometry, and a second-order or third-order curve equation may be used to express a simple curve. However, in an actual application scenario, a shape of the lane line is variable, and may be a straight line or a curve, or may be a combination of a straight line and a curve. Therefore, in the present disclosure, a fifth-order equation is used as an example to describe an implementation procedure of rendering based on the data of the lane line.

Based on this, a left-lane curve equation may be constructed as follows:

$$y_L = a_{4L}x^4 + a_{3L}x^3 + a_{2L}x^2 + a_{1L}x + a_{0L}; \quad \text{formula (1)}$$

Based on this, a right-lane curve equation may be constructed as follows:

$$y_R = a_{4R}x^4 + a_{3R}x^3 + a_{2R}x^2 + a_{1R}x + a_{0R}; \quad \text{formula (2)}$$

$y_L$ represents left-lane coordinates, x represents a coordinate value, and $y_R$ represents right-lane coordinates. $a_{0L}$ to $a_{4L}$ represent coefficients of the left-lane curve equation, and $a_{0R}$ to $a_{4R}$ represent coefficients of the right-lane curve equation.

Figure 19:
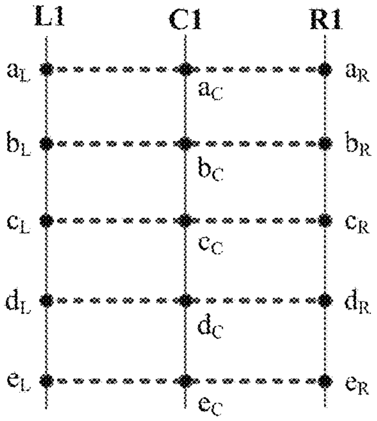
FIG. 19 is a schematic diagram of calculating a lane center line according to an embodiment of the present disclosure.

After the coordinate value is determined, the left-lane coordinates and the right-lane coordinates may be calculated. For ease of understanding, FIG. 19 is a schematic diagram of calculating a lane center line according to an embodiment of the present disclosure. As shown in the figure, an example in which T is 5 is used. It is assumed that a left-lane line is L1, and a right-lane line is R1. An intersection [startX, endX] between value ranges of L1 and R1 is taken, and a same coordinate value x in the value ranges is selected and substituted into a curve equation, to calculate corresponding $y_L$ and $y_R$. Therefore, five left-lane coordinates (namely, $a_L$, $b_L$, $c_L$, $d_L$, $e_L$) and five right-lane coordinates (namely, $a_R$, $b_R$, $c_R$, $d_R$, $e_R$) are obtained. Based on this, a midpoint between $a_L$ and $a_R$, a midpoint between $b_L$ and $b_R$, a midpoint between $c_L$ and $c_R$, a midpoint between $d_L$ and $d_R$, and a midpoint between $e_L$ and $e_R$ are separately calculated. A curve formed by connecting the midpoints in a string is the lane center line. In addition to the lane center line, a lane line (including a left-lane line and a right-lane line) may further be calculated. For example, a curve formed by connecting $a_L$, $b_L$, $c_L$, $d_L$, $e_L$ is a left-lane boundary (namely, the left-lane line), and a curve formed by connecting $a_R$, $b_R$, $c_R$, $d_R$, $e_R$ is a right-lane boundary (namely, the right-lane line).

Pseudocode for calculating a point string is as follows:

```
For x = startX; x <= endX; x+=1
y_L = a_4L x^4 + a_3L x^3 + a_2L x^2 + a_1L x + a_0L;
y_R = a_4R x^4 + a_3R x^3 + a_2R x^2 + a_1R x + a_0R;
End
```

A driving guide line may be generated based on the lane center line. For example, in a case of straight traveling, the driving guide line is the lane center line. For example, in a case of lane changing, the driving guide line includes the lane center line of the target lane and a lane center line of a to-be-changed lane.

Figure 20:
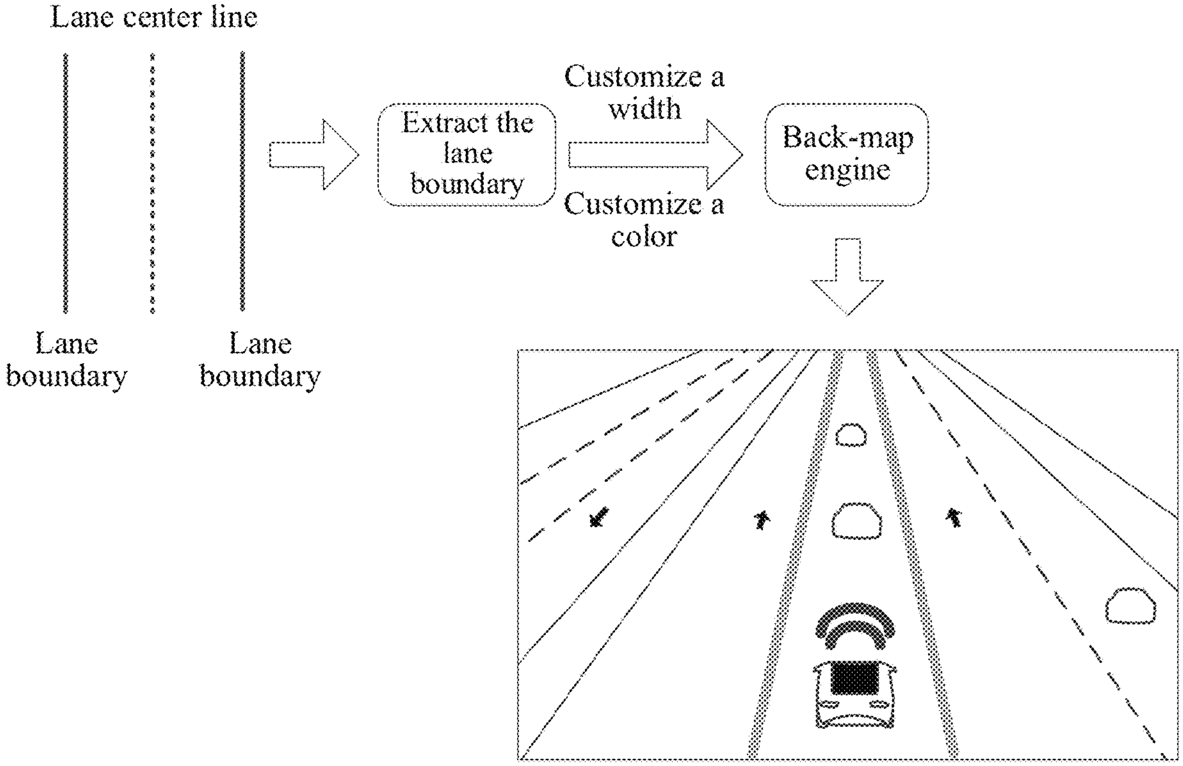
FIG. 20 is a schematic flowchart of drawing a lane line according to an embodiment of the present disclosure.

For example, FIG. 20 is a schematic flowchart of drawing a lane line according to an embodiment of the present disclosure. As shown in the figure, after a lane center line and a lane boundary are calculated, the lane boundary may be extracted and rendered based on a customized width and a customized color, to display a corresponding driving interface.

Figure 21:
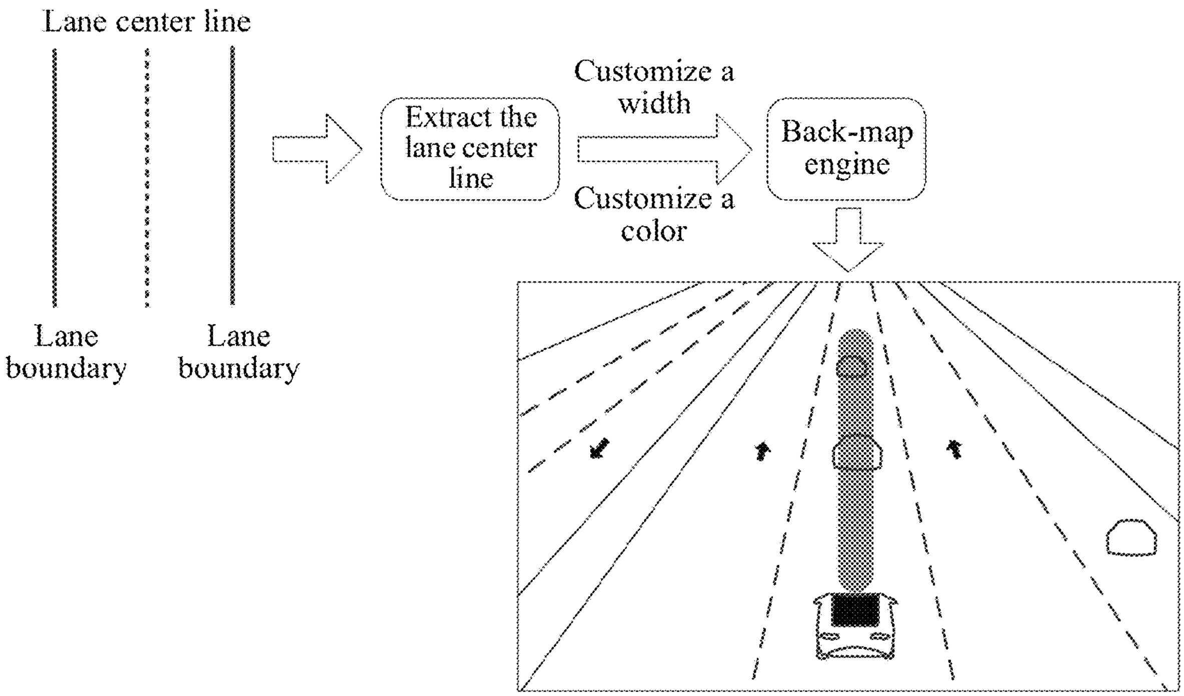
FIG. 21 is a schematic flowchart of drawing a driving guide line according to an embodiment of the present disclosure.

For example, FIG. 21 is a schematic flowchart of drawing a driving guide line according to an embodiment of the present disclosure. As shown in the figure, after a lane center line and a lane boundary are calculated, the lane center line may be extracted and rendered based on a customized width and a customized color, to display a corresponding driving interface.

Again, in this embodiment of the present disclosure, the manner of calculating the lane boundary and the lane center line is provided. In the foregoing manner, the lane center line and the driving guide line that are more reliable can be calculated, so that the user can learn a driving path of the vehicle.

When the target lane is presented, the first vehicle-falling point and the second vehicle-falling point may further be displayed. A manner of determining the first vehicle-falling point and the second vehicle-falling point is described below. Based on the foregoing embodiments corresponding to FIG. 4, in another embodiment of the present disclosure, the display method may further include:

- obtaining a lane center line of the to-be-changed lane;
- drawing a vertical line to the lane center line of the to-be-changed lane based on a location of the target vehicle, and using an obtained perpendicular foot as the first vehicle-falling point of the target vehicle;
- obtaining a lane-change speed, lane-change duration, and a steering angle that are of the target vehicle;
- determining a lane-change traveling distance based on the lane-change speed, the lane-change duration, and the steering angle; and
- determining the second vehicle-falling point of the target vehicle based on the first vehicle-falling point and the lane-change traveling distance.

In various embodiments, a manner of calculating the first vehicle-falling point and the second vehicle-falling point is described. It can be learned from the foregoing embodiments that, a lane-changing status depends on the data of the lane line of the target lane and the data of the lane line of the surrounding lane that are sensed by the sensing system. Assuming that the target vehicle changes to a lane on the right, data of left and right lane lines of the target lane and data of a lane line of the lane on the right of the target lane need to be obtained. Assuming that the target vehicle changes to a lane on the left, the data of the left and right lane lines of the target lane and data of a lane line of the lane on the left of the target lane need to be obtained.

Figure 22:
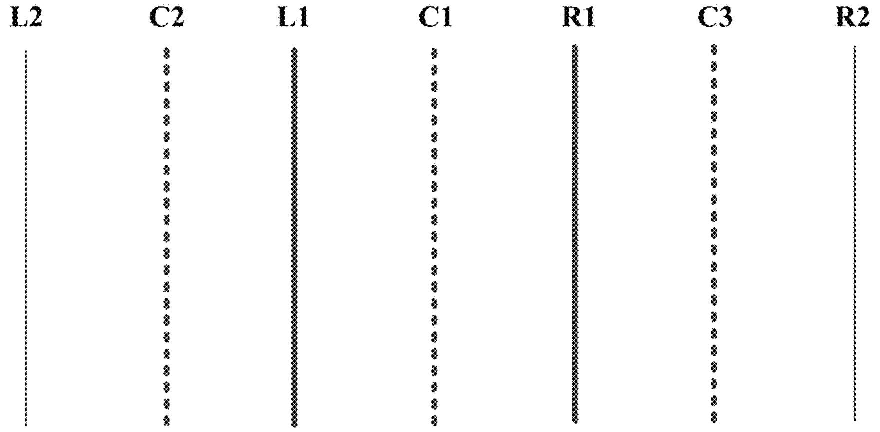
FIG. 22 is a schematic diagram of adjacent lane center lines according to an embodiment of the present disclosure.

For ease of understanding, FIG. 22 is a schematic diagram of adjacent lane center lines according to an embodiment of the present disclosure. As shown in the figure, a lane center line C1 is calculated based on data of left and right lane lines (namely, L1 and R1) of the target lane. When the target vehicle changes to a lane on the left, that is, a to-be-changed lane is the lane on the left, a lane center line C2 is calculated based on the data of the lane line L1 and data of a lane line L2. When the target vehicle changes to a lane on the right, that is, a to-be-changed lane is the lane on the right, a lane center line C3 is calculated based on the data of the lane line R1 and data of a lane line R2. For a manner of calculating the lane center line, refer to the foregoing embodiment. Details are not described herein again.

Figure 23:
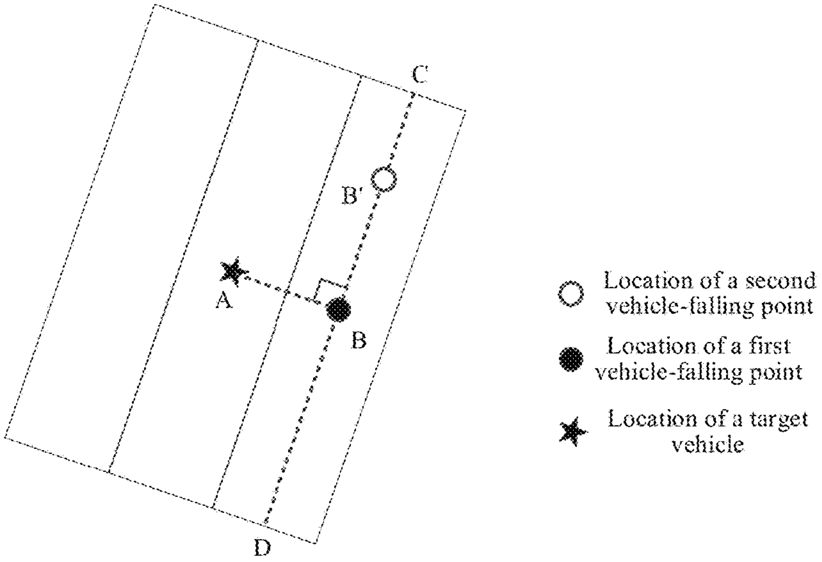
FIG. 23 is a schematic diagram of calculating a vehicle-falling point according to an embodiment of the present disclosure.

Based on this, an example in which the to-be-changed lane is the lane on the right is used. FIG. 23 is a schematic diagram of calculating a vehicle-falling point according to an embodiment of the present disclosure. As shown in the figure, a point A represents a location of the target vehicle, and a line segment CD represents a lane center line of the to-be-changed lane. A vertical line is drawn from the point A to the line segment CD, and a perpendicular foot is B. The point B is the first vehicle-falling point of the target vehicle. The point B represents a schematic diagram of lane changing, but is not the actual second vehicle-falling point. When the second vehicle-falling point is calculated, lane-change duration and a speed of the target vehicle need to be considered. A specific calculation manner is as follows:

$$BB' = AB' * \sin(\angle B'AB) = v * 3 * \sin(\theta); \qquad \text{formula (3)}$$

BB' represents a location of the point B plus a distance for which the target vehicle moves during lane changing, that is, a lane-change traveling distance. AB' represents a distance between the point A and a point B'. If a lane-change speed is v meters per second, and the lane-change duration is 3 seconds, AB'=v*3. ∠B'AB represents a steering angle, that is, θ. Therefore, the location (namely, B') of the second vehicle-falling point of the target vehicle may be obtained based on the first vehicle-falling point and the lane-change traveling distance.

Figure 24:
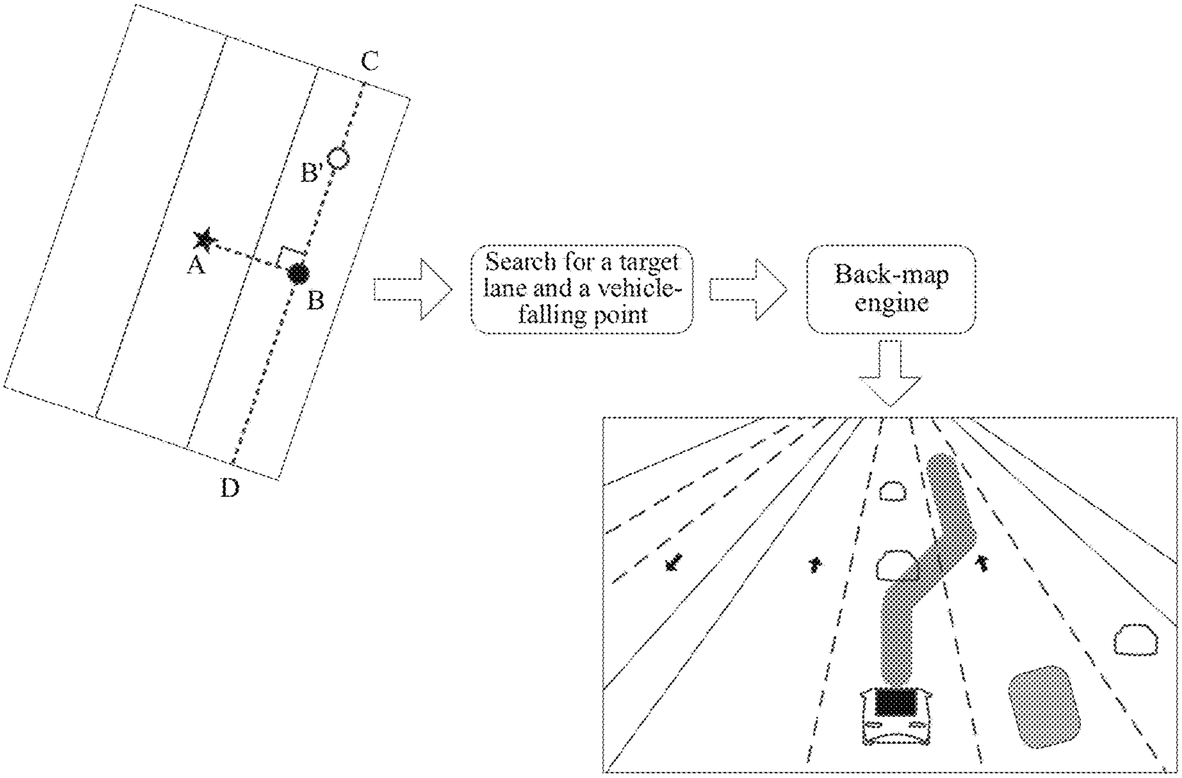
FIG. 24 is a schematic flowchart of drawing a target lane and a vehicle-falling point according to an embodiment of the present disclosure.

For example, FIG. 24 is a schematic flowchart of drawing a target lane and a vehicle-falling point according to an embodiment of the present disclosure. As shown in the figure, after the target lane, the first vehicle-falling point, and the second vehicle-falling point are calculated, a back-map rendering may be performed, to display a corresponding driving interface.

In this embodiment of the present disclosure, the manner of calculating the first vehicle-falling point and the second vehicle-falling point is provided. In the foregoing manner, a more reliable location of the vehicle-falling point can be calculated, so that the user can learn a driving path of the vehicle.

Based on the foregoing embodiments corresponding to FIG. 4, in another embodiment of the present disclosure, before the second stable-state icon is displayed on the driving interface, the display method may further include:

obtaining icon animation data of the second stable-state icon and back-map animation data of a lane back map;

generating M frames of to-be-rendered data based on the icon animation data and the back-map animation data, where M is an integer greater than 1;

adding the M frames of to-be-rendered data to a message queue; and obtaining N frames of to-be-rendered data based on the message queue, where N is an integer greater than 1.

The displaying the second stable-state icon on the driving interface may specifically include:

rendering the N frames of to-be-rendered data, to display the second stable-state icon and the lane back map on the driving interface.

In various embodiments, a manner of implementing frame synchronization based on the icon and the lane back map is described. It can be learned from the foregoing embodiments that, not only the icon (for example, the second stable-state icon) can be displayed on the driving interface, but also the lane back map corresponding to the current driving state can be displayed. For example, the second stable-state icon and the lane back map are rendered. First, the icon animation data of the second stable-state icon and the back-map animation data of the lane back map may be obtained. Frame rates of the icon animation data and the back-map animation data may be 10 Hertz (Hz). Then, the icon animation data and the back-map animation data are synchronized, to generate the M frames of to-be-rendered data. Then, the generated M frames of to-be-rendered data are added to the message queue, and the N frames of to-be-rendered data in the message queue are rendered, to represent the second stable-state icon and the lane back map.

Figure 25:
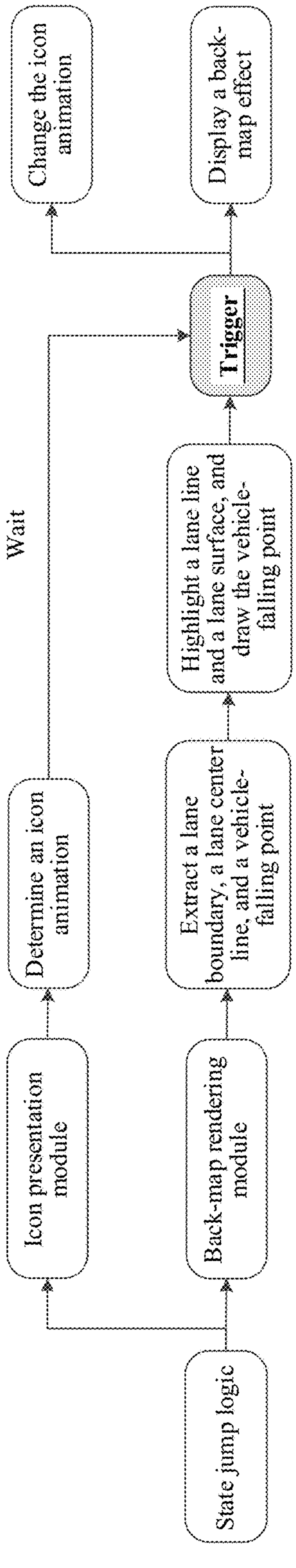
FIG. 25 is a schematic diagram of a multi-state processing procedure according to an embodiment of the present disclosure.

For ease of understanding, FIG. 25 is a schematic diagram of a multi-state processing procedure according to an embodiment of the present disclosure. As shown in the figure, an icon presentation module and a back-map rendering module are two independent processing modules. To ensure a consistency effect, data of the two modules needs to be synchronized. A jump result that is based on a driving state is outputted to the icon presentation module and the back-map rendering module respectively. The icon presentation module calculates an icon and an animation that need to be displayed, and outputs a preparation signal to a trigger after the calculation is completed. The back-map rendering module calculates a lane boundary line, a lane center line, and a vehicle-falling point, then renders the lane line, the lane surface, and the vehicle-falling point in the back map, and notifies the trigger after the back map is drawn. When receiving the signals from the two modules, the trigger triggers the icon animation and replaces a back-map frame. In this process, the back-map rendering module consumes long duration. Usually, the icon presentation module waits for the back-map rendering module.

Next, in this embodiment of the present disclosure, the manner of implementing the frame synchronization based on the icon and the lane back map is provided. In the foregoing manner, icon rendering and rendering of the lane back map are synchronized, thereby implementing picture synchronization and improving visual experience.

Based on the foregoing embodiments corresponding to FIG. 4, in another embodiment of the present disclosure, before the second stable-state icon is displayed on the driving interface, the display method may further include:

obtaining icon animation data of the second stable-state icon and speech data of a state-activating message;

generating M frames of to-be-rendered data based on the icon animation data and the speech data, where M is an integer greater than 1;

adding the M frames of to-be-rendered data to a message queue; and obtaining N frames of to-be-rendered data based on the message queue, where N is an integer greater than 1.

The displaying the second stable-state icon on the driving interface may specifically include:

rendering the N frames of to-be-rendered data, to display the second stable-state icon on the driving interface, and voice-playing the state-activating message.

In various embodiments, a manner of implementing multi-frame synchronization based on the icon and the speech is described. It can be learned from the foregoing embodiments that, not only the icon (for example, the second stable-state icon) can be displayed on the driving interface, but also a speech message (for example, the state-activating message) corresponding to the current driving state can be played. For example, the second stable-state icon and the state-activating message are rendered. First, the icon animation data of the second stable-state icon and the speech data of the state-activating message may be obtained. Frame rates of the icon animation data and the speech data may be 10 Hz. Then, the icon animation data and the speech data are synchronized, to generate the M frames of to-be-rendered data. Then, the generated M frames of to-be-rendered data are added to the message queue, and the N frames of to-be-rendered data in the message queue are rendered, to represent the second stable-state icon and play the speech message.

Figure 26:
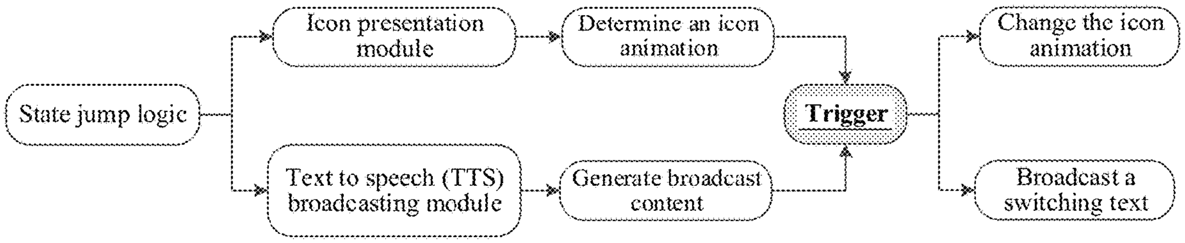
FIG. 26 is another schematic diagram of a multi-state processing procedure according to an embodiment of the present disclosure.

For ease of understanding, FIG. 26 is another schematic diagram of a multi-state processing procedure according to an embodiment of the present disclosure. As shown in the figure, an icon presentation module and a TTS broadcasting module are two independent processing modules. To ensure a consistency effect, data of the two modules needs to be synchronized. A jump result that is based on a driving state is outputted to the icon presentation module and the TTS broadcasting module respectively. The icon presentation module calculates an icon and an animation that need to be displayed, and outputs a preparation signal to a trigger after the calculation is completed. The TTS broadcasting module calculates a text that needs to be broadcast, and outputs a preparation signal to the trigger after the calculation is completed. When receiving the signals from the two modules, the trigger triggers the icon animation and broadcasts the text.

Next, in this embodiment of the present disclosure, the manner of implementing the multi-frame synchronization based on the icon and the speech is provided. In the foregoing manner, icon rendering and speech rendering are synchronized, thereby implementing audio and picture synchronization and improving visual and audio experience.

Based on the foregoing embodiments corresponding to FIG. 4, in another embodiment of the present disclosure, before the second stable-state icon is displayed on the driving interface, the display method may further include:

obtaining icon animation data of the second stable-state icon, back-map animation data of a lane back map, and speech data of a state-activating message;

generating M frames of to-be-rendered data based on the icon animation data, the back-map animation data, and the speech data, where M is an integer greater than 1;

adding the M frames of to-be-rendered data to a message queue; and obtaining N frames of to-be-rendered data based on the message queue, where N is an integer greater than 1.

The displaying the second stable-state icon on the driving interface may specifically include:

rendering the N frames of to-be-rendered data, to display the second stable-state icon and the lane back map on the driving interface, and voice-playing the state-activating message.

In various embodiments, a manner of implementing multi-frame synchronization based on the icon, the lane back map, and the speech is described. It can be learned from the foregoing embodiments that, not only the icon (for example, the second stable-state icon) can be displayed on the driving interface, but also the lane back map corresponding to the current driving state can be displayed, and a speech message (for example, the state-activating message) corresponding to the current driving state can be played. For example, the second stable-state icon, the lane back map, and the state-activating message are rendered. First, the icon animation data of the second stable-state icon, the back-map animation data of the lane back map, and the speech data of the state-activating message may be obtained. Frame rates of the icon animation data, the back-map animation data, and the speech data may be 10 Hz. Then, the icon animation data, the back-map animation data, and the back-map animation data are synchronized, to generate the M frames of to-be-rendered data. Then, the generated M frames of to-be-rendered data are added to the message queue, and the N frames of to-be-rendered data in the message queue are rendered, to represent the second stable-state icon and the lane back map, and play the speech message.

Figure 27:
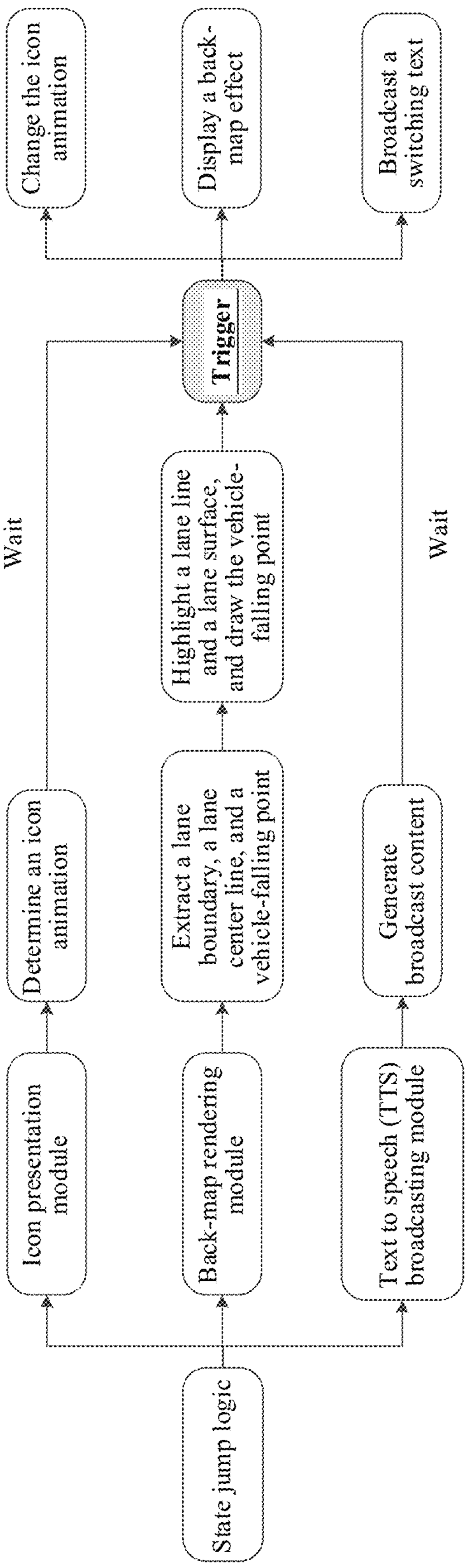
FIG. 27 is another schematic diagram of a multi-state processing procedure according to an embodiment of the present disclosure.

For ease of understanding, FIG. 27 is another schematic diagram of a multi-state processing procedure according to an embodiment of the present disclosure. As shown in the figure, an icon presentation module, a back-map rendering module, and a TTS broadcasting module are three independent processing modules. To ensure a consistency effect, data of the three modules needs to be synchronized. A jump result that is based on a driving state is outputted to the icon presentation module, the back-map rendering module, and the TTS broadcasting module respectively. The icon presentation module calculates an icon and an animation that need to be displayed, and outputs a preparation signal to a trigger after the calculation is completed. The back-map rendering module calculates a lane boundary line, a lane center line, and a vehicle-falling point, then renders the lane line, the lane surface, and the vehicle-falling point in the back map, and notifies the trigger after the back map is drawn. The TTS broadcasting module calculates a text that needs to be broadcast, and outputs a preparation signal to the trigger after the calculation is completed. When receiving the signals from the three modules, the trigger triggers the icon animation, replaces a back-map frame, and broadcasts the text. In this process, the back-map rendering module consumes longest duration. Usually, the icon presentation module and the TTS broadcasting module wait for the back-map rendering module.

Figure 28:
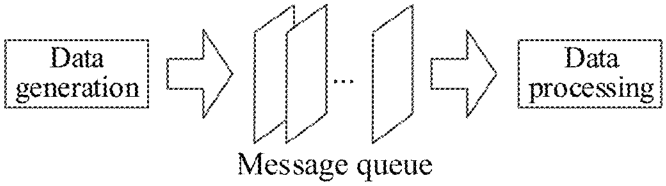
FIG. 28 is a schematic diagram of a data processing procedure according to an embodiment of the present disclosure.

The following describes a data processing procedure with reference to FIG. 28. FIG. 28 is a schematic diagram of a data processing procedure according to an embodiment of the present disclosure. As shown in the figure, a data producer focuses on only data production, produces data at a fixed frequency, and pushes the data to a message queue. A data consumer focuses on only data processing, and extracts the data from the message queue based on a fixed frequency or a processing capability. A benefit of this processing solution is that production and consumption are isolated, and a system coupling degree is low.

The data processing includes, but is not limited to, data parsing, value calculation (to be specific, calculating a location based on a curve equation), back-map rendering, and the like.

A current mapping drawing effect is rendered based on sensing data. Subsequently, other sensing data (such as radar sensing data) may be added, to optimize a current rendering effect.

Next, in this embodiment of the present disclosure, the manner of implementing the multi-frame synchronization based on the icon, the lane back map, and the speech is provided. In the foregoing manner, icon rendering, rendering of the lane back map, and speech rendering are synchronized, thereby implementing audio and picture synchronization and improving visual and audio experience.

Based on the foregoing embodiments corresponding to FIG. 4, in another embodiment of the present disclosure, the obtaining the N frames of to-be-rendered data based on the message queue may specifically include:

obtaining K consecutive frames of to-be-rendered data from the message queue, where K is an integer greater than 2; and discarding at least two consecutive frames of to-be-rendered data in the K frames of to-be-rendered data, to obtain the N frames of to-be-rendered data.

In various embodiments, a manner of processing data based on a policy of sequentially discarding frames is described. It can be learned from the foregoing embodiments that, in consideration of that a prompt frequency for state switching does not need to be displayed at a high frequency, data processing efficiency can be optimized by discarding a part of data frames. Based on this, after data is generated, the data is pushed to a message queue first, and then a frame-discarding processing module is added to a link for data processing of the message queue. A processing manner of the frame-discarding processing module is described below with reference to the accompanying drawings.

Figure 29:
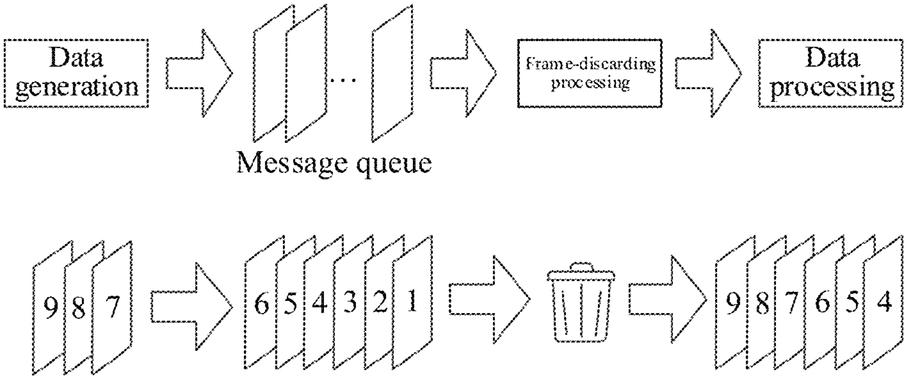
FIG. 29 is a schematic diagram of frame-discarding processing according to an embodiment of the present disclosure.

For ease of understanding, FIG. 29 is a schematic diagram of frame-discarding processing according to an embodiment of the present disclosure. As shown in the figure, it is assumed that M frames of to-be-rendered data (namely, a frame 7 to a frame 9) are newly generated. In this case, K frames of to-be-rendered data (namely, a frame 1 to a frame 6) have been accumulated in a message queue. In this case, at least two consecutive frames of to-be-rendered data in the K frames of to-be-rendered data are discarded. For example, the frame 1 to the frame 3 are discarded. Then, the frame 7 to the frame 9 are added to the message queue. In other words, N frames of to-be-rendered data include the frame 4 to the frame 9.

Assuming that a data frame rate is 10 Hz, a time interval between every two frames of to-be-rendered data is 100 ms. Based on this, a time interval between to-be-rendered data after the frame-discarding processing may be 400 ms. An objective of inter-frame optimization is to maintain a state display effect while reducing a frequency of data processing.

In this embodiment of the present disclosure, the manner of processing data based on the policy of sequentially discarding frames is provided. In the foregoing manner, a problem that a data production capability does not match a data processing speed is resolved, a case that data is accumulated in the message queue is prevented, and the manner is applicable to a scenario with a high requirement on data updating.

Based on the foregoing embodiments corresponding to FIG. 4, in another embodiment of the present disclosure, the obtaining the N frames of to-be-rendered data based on the message queue may specifically include:

obtaining K consecutive frames of to-be-rendered data from the message queue, where K is an integer greater than 2; and discarding at least two non-consecutive frames of to-be-rendered data in the K frames of to-be-rendered data, to obtain the N frames of to-be-rendered data.

In various embodiments, a manner of processing data based on a policy of discarding frames at intervals is described. It can be learned from the foregoing embodiments that, in consideration of that a prompt frequency for state switching does not need to be displayed at a high frequency, data processing efficiency can be optimized by discarding a part of data frames. Based on this, after data is generated, the data is pushed to a message queue first, and then a frame-discarding processing module is added to a link for data processing of the message queue. A processing manner of the frame-discarding processing module is described below with reference to the accompanying drawings.

Figure 30:
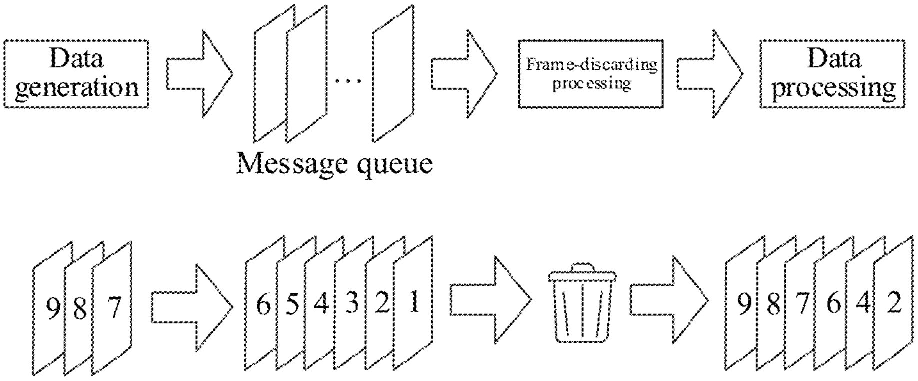
FIG. 30 is another schematic diagram of frame-discarding processing according to an embodiment of the present disclosure.

For ease of understanding, FIG. 30 is another schematic diagram of frame-discarding processing according to an embodiment of the present disclosure. As shown in the figure, it is assumed that M frames of to-be-rendered data (namely, a frame 7 to a frame 9) are newly generated. In this case, K frames of to-be-rendered data (namely, a frame 1 to a frame 6) have been accumulated in a message queue. In this case, at least two non-consecutive frames of to-be-rendered data in the K frames of to-be-rendered data are discarded. For example, the frame 1, the frame 3, and the frame 5 are discarded. Then, the frame 7 to the frame 9 are added to the message queue. In other words, N frames of to-be-rendered data include the frame 2, the frame 4, the frame 6, the frame 7, the frame 8, and the frame 9.

Assuming that a data frame rate is 10 Hz, a time interval between every two frames of to-be-rendered data is 100 ms. Based on this, a time interval between to-be-rendered data after the frame-discarding processing may be 200 ms. A rendering freezing effect is adjusted (e.g., reduced). An objective of inter-frame optimization is to maintain a state display effect while reducing a frequency of data processing.

In this embodiment of the present disclosure, the manner of processing data based on the policy of discarding frames at intervals is provided. In the foregoing manner, a problem that a data production capability does not match a data processing speed is resolved, and a case that data is accumulated in the message queue is prevented. In addition, an interval between data can also be reduced based on frame discarding, so that the rendering freezing effect is greatly optimized. The manner is applicable to a scenario with a high requirement on data continuity.

Figure 31:
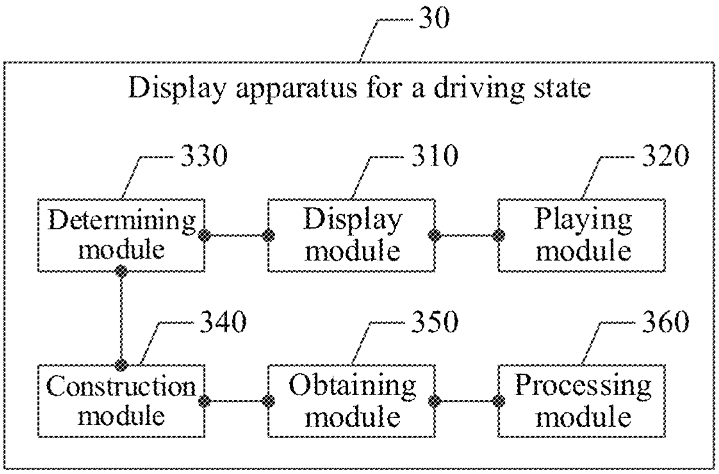
FIG. 31 is a schematic diagram of a display apparatus for a driving state according to an embodiment of the present disclosure.

The following describes a display apparatus for a driving state in the present disclosure in detail. FIG. 31 is a schematic diagram of an embodiment of a display apparatus for a driving state according to an embodiment of the present disclosure. The display apparatus 30 for a driving state includes:

a display module 310, configured to display a first stable-state icon on a driving interface of a target vehicle, where the first stable-state icon is configured for prompting that the target vehicle is in a first driving state.

The display module 310 is further configured to display a first available-state icon on the driving interface when a driving-state switching condition is satisfied 310, where the first available-state icon is configured for prompting that the target vehicle can activate a second driving state.

The display module 310 is further configured to display a second stable-state icon on the driving interface if the target vehicle is switched to the second driving state 310, where the second stable-state icon is configured for prompting that the target vehicle is in the second driving state.

In this embodiment of the present disclosure, the display apparatus for a driving state is provided. When the apparatus is used, during driving, different driving states may be presented by using the driving interface, so that perception and understanding of a user for the driving states are enhanced in an intelligent icon-display manner.

In one embodiment, based on the embodiment corresponding to FIG. 31, in another embodiment of the display apparatus 30 for a driving state provided in this embodiment of the present disclosure:

- the first driving state is a manual driving state, and the second driving state is an adaptive-cruise-control driving state;
- the first driving state is a manual driving state, and the second driving state is a lane-center-control driving state;
- the first driving state is a manual driving state, and the second driving state is a navigate-on-autopilot driving state;
- the first driving state is an adaptive-cruise-control driving state, and the second driving state is a lane-center-control driving state;
- the first driving state is an adaptive-cruise-control driving state, and the second driving state is a navigate-on-autopilot driving state; or
- the first driving state is a lane-center-control driving state, and the second driving state is a navigate-on-autopilot driving state.

In this embodiment of the present disclosure, the display apparatus for a driving state is provided. When the apparatus is used, switching can be implemented between the manual driving state, the ACC driving state, the LCC driving state, and the NOA driving state, thereby improving flexibility and feasibility of the solution.

In one embodiment, based on the embodiment corresponding to FIG. 31, in another embodiment of the display apparatus 30 for a driving state provided in this embodiment of the present disclosure, the display apparatus 30 for a driving state further includes a playing module 320.

The playing module 320 is configured to play first dynamic information on the driving interface when the driving-state switching condition is satisfied, where the first dynamic information is configured for prompting that the target vehicle can activate the second driving state.

The playing module 320 is further configured to cancel playing the first dynamic information on the driving interface when play duration of the first dynamic information reaches a first play-duration threshold.

In this embodiment of the present disclosure, the display apparatus for a driving state is provided. When the apparatus is used, based on guidance of the dynamic information and the static information, a user is provided with a more intuitive driving-state change by combining the dynamic information and the static information, to ensure that the user can learn a latest driving state. The user can be quickly familiar with an operation of the autonomous driving system, and a higher-dimensional information revelation capability is provided, thereby improving quality perception of the autonomous driving system.

In one embodiment, based on the embodiment corresponding to FIG. 31, in another embodiment of the display apparatus 30 for a driving state provided in this embodiment of the present disclosure:

The playing module 320 is further configured to play second dynamic information on the driving interface if the target vehicle is switched to the second driving state, where the second dynamic information is configured for prompting that the vehicle is in the second driving state.

The playing module 320 is further configured to cancel playing the second dynamic information on the driving interface when play duration of the second dynamic information reaches a second play-duration threshold.

In this embodiment of the present disclosure, the display apparatus for a driving state is provided. When the apparatus is used, based on guidance of the dynamic information and the static information, a user is provided with a more intuitive driving-state change by combining the dynamic information and the static information, to ensure that the user can learn a latest driving state. The user can be quickly familiar with an operation of the autonomous driving system, and a higher-dimensional information revelation capability is provided, thereby improving quality perception of the autonomous driving system.

In one embodiment, based on the embodiment corresponding to FIG. 31, in another embodiment of the display apparatus 30 for a driving state provided in this embodiment of the present disclosure:

The display module 310 is further configured to: after displaying the first available-state icon on the driving interface when the driving-state switching condition is satisfied, display a third stable-state icon on the driving interface if the target vehicle is switched to a third driving state, where the third stable-state icon is configured for prompting that the target vehicle is in the third driving state.

In this embodiment of the present disclosure, the display apparatus for a driving state is provided. When the apparatus is used, if the target vehicle can currently support a plurality of driving states, the highest-level driving state may be preferentially displayed. In this case, the user is still supported to manually switch to the lower-level driving state. Therefore, feasibility and flexibility of the solution are improved.

In one embodiment, based on the embodiment corresponding to FIG. 31, in another embodiment of the display apparatus 30 for a driving state provided in this embodiment of the present disclosure:

- the first driving state is a manual driving state, the second driving state is a lane-center-control driving state, and the third driving state is an adaptive-cruise-control driving state;
- the first driving state is a manual driving state, the second driving state is a navigate-on-autopilot driving state, and the third driving state is an adaptive-cruise-control driving state;
- the first driving state is a manual driving state, the second driving state is a navigate-on-autopilot driving state, and the third driving state is a lane-center-control driving state; or
- the first driving state is an adaptive-cruise-control driving state, the second driving state is a navigate-on-autopilot driving state, and the third driving state is a lane-center-control driving state.

In this embodiment of the present disclosure, the display apparatus for a driving state is provided. When the apparatus is used, switching can be implemented between the manual driving state, the ACC driving state, the LCC driving state, and the NOA driving state, thereby improving flexibility and feasibility of the solution.

In one embodiment, based on the embodiment corresponding to FIG. 31, in another embodiment of the display apparatus 30 for a driving state provided in this embodiment of the present disclosure:

The playing module 320 is further configured to voice-play a state-activating message if the target vehicle is switched to the second driving state, where the state-activating message is configured for prompting that the target vehicle is in the second driving state; or the playing module 320 is further configured to: in a process of voice-playing a to-be-played message, if the target vehicle is switched to the second driving state, switch the to-be-played message that is voice played to a state-activating message, where a play priority corresponding to the state-activating message is higher than a play priority corresponding to the to-be-played message; or the playing module 320 is further configured to: in a process of voice-playing a to-be-played message, if the target vehicle is switched to the second driving state, voice-play a state-activating message after the playing of the to-be-played message ends, where a play priority corresponding to the to-be-played message is higher than a play priority corresponding to the state-activating message.

In one embodiment of the present disclosure, the display apparatus for a driving state is provided. When the apparatus is used, when an original state jumps to a target state, not only a state icon can be displayed, but also a state change can be reported through the TTS. In this way, perception of the user for the autonomous driving state can be further enhanced with reference to the speech broadcast.

In one embodiment, based on the embodiment corresponding to FIG. 31, in another embodiment of the display apparatus 30 for a driving state provided in this embodiment of the present disclosure:

The display module 310 is further configured to: after displaying the second stable-state icon on the driving interface, update the second stable-state icon to a second available-state icon if the target vehicle quits the second driving state, where the second available-state icon is configured for prompting that the target vehicle can activate a corresponding driving state;

or the display module 310 is further configured to: after displaying the second stable-state icon on the driving interface, cancel displaying the second stable-state icon on the driving interface if the target vehicle quits the second driving state.

In this embodiment of the present disclosure, the display apparatus for a driving state is provided. When the apparatus is used, prompting may also be performed when a driving state is quit, to facilitate timely perception of the user, thereby helping improve driving safety.

In one embodiment, based on the embodiment corresponding to FIG. 31, in another embodiment of the display apparatus 30 for a driving state provided in this embodiment of the present disclosure:

The playing module 320 is further configured to voice-play a state-quitting message if the target vehicle quits the second driving state, where the state-quitting message is configured for prompting that the target vehicle quits the second driving state; or the playing module 320 is further configured to: in a process of voice-playing a to-be-played message, if the target vehicle quits the second driving state, switch the to-be-played message that is voice-played to a state-quitting message, where a play priority corresponding to the state-quitting message is higher than a play priority corresponding to the to-be-played message; or the playing module 320 is further configured to: in a process of voice-playing a to-be-played message, if the target vehicle quits the second driving state, voice-play a state-quitting message after the playing of the to-be-played message ends, where a play priority corresponding to the to-be-played message is higher than a play priority corresponding to the state-quitting message.

In this embodiment of the present disclosure, the display apparatus for a driving state is provided. When the apparatus is used, prompting may further be performed through the TTS when the autonomous driving state is quit. Perception of the user for the autonomous driving state can be further enhanced with reference to the speech broadcast, thereby helping improve driving safety.

In one embodiment, based on the embodiment corresponding to FIG. 31, in another embodiment of the display apparatus 30 for a driving state provided in this embodiment of the present disclosure, the display apparatus 30 for a driving state further includes a determining module 330.

The display module 310 is further configured to display, on a speech setting interface in response to a speech setting instruction, a download control and a preview control that correspond to a to-be-used tone.

The display module 310 is further configured to download an available speech in response to a selection operation for the download control, and displaying a use control corresponding to the to-be-used tone.

The determining module 330 is further configured to: in response to a selection operation for the use control, use the to-be-used tone as a tone for voice-playing.

The playing module 320 is further configured to: in response to a selection operation for the preview control, voice-play a preset text using the to-be-used tone.

In this embodiment of the present disclosure, the display apparatus for a driving state is provided. When the apparatus is used, the special TTS speech broadcast may be used, so that sound and light are combined to provide the user with immersive experience of sensing the autonomous driving state. Meanwhile, the special TTS speech broadcast is used, so that strangeness of the autonomous driving system to the user is reduced, and the user is closer to the autonomous driving system.

In one embodiment, based on the embodiment corresponding to FIG. 31, in another embodiment of the display apparatus 30 for a driving state provided in this embodiment of the present disclosure, the first driving state is a manual driving state.

The display module 310 is specifically configured to display the first stable-state icon and a lane back map on the driving interface, where the lane back map includes at least one lane, and the at least one lane includes a target lane on which the target vehicle is located.

A presentation form of the target lane includes at least one of the following:

highlighting the target lane;

displaying a lane line of the target lane; and displaying a driving guide line.

In this embodiment of the present disclosure, the display apparatus for a driving state is provided. When the apparatus is used, perception and understanding of the user for the autonomous driving state can be enhanced from three aspects. To be specific, the autonomous driving state is presented on the HMI, an operation of the autonomous driving system and a vehicle traveling status are rendered, and an operating status of the autonomous driving system is jointly expressed in combination with the speech broadcast.

In one embodiment, based on the embodiment corresponding to FIG. 31, in another embodiment of the display apparatus 30 for a driving state provided in this embodiment of the present disclosure, the second driving state is an adaptive-cruise-control driving state.

The display module 310 is specifically configured to display the second stable-state icon and a lane back map on the driving interface, where the lane back map includes at least one lane, and the at least one lane includes a target lane on which the target vehicle is located.

A presentation form of the target lane includes at least one of the following:

displaying a radar wave corresponding to the target vehicle on the target lane;

highlighting the target lane;

displaying a lane line of the target lane; and displaying a driving guide line.

In this embodiment of the present disclosure, the display apparatus for a driving state is provided. When the apparatus is used, perception and understanding of the user for the autonomous driving state can be enhanced from three aspects. To be specific, the autonomous driving state is presented on the HMI, an operation of the autonomous driving system and a vehicle traveling status are rendered, and an operating status of the autonomous driving system is jointly expressed in combination with the speech broadcast.

In one embodiment, based on the embodiment corresponding to FIG. 31, in another embodiment of the display apparatus 30 for a driving state provided in this embodiment of the present disclosure, the second driving state is a lane-center-control driving state.

The display module 310 is specifically configured to display the second stable-state icon and a lane back map on the driving interface, where the lane back map includes at least one lane, and the at least one lane includes a target lane on which the target vehicle is located.

A presentation form of the target lane includes at least one of the following:

highlighting the target lane;

displaying a lane line of the target lane; and displaying a driving guide line.

In this embodiment of the present disclosure, the display apparatus for a driving state is provided. When the apparatus is used, perception and understanding of the user for the autonomous driving state can be enhanced from three aspects. To be specific, the autonomous driving state is presented on the HMI, an operation of the autonomous driving system and a vehicle traveling status are rendered, and an operating status of the autonomous driving system is jointly expressed in combination with the speech broadcast.

In one embodiment, based on the embodiment corresponding to FIG. 31, in another embodiment of the display apparatus 30 for a driving state provided in this embodiment of the present disclosure, the second driving state is a navigate-on-autopilot driving state.

The display module 310 is specifically configured to display the second stable-state icon and a lane back map on the driving interface, where the lane back map includes at least two lanes, and the at least two lanes include a target lane on which the target vehicle is located.

A presentation form of the target lane includes at least one of the following:

displaying a first vehicle-falling point for the target vehicle on a to-be-changed lane;

displaying a second vehicle-falling point for the target vehicle on the to-be-changed lane, where positioning accuracy of the second vehicle-falling point is higher than positioning accuracy of the first vehicle-falling point;

highlighting the target lane;

displaying a lane line of the target lane; and displaying a driving guide line.

In this embodiment of the present disclosure, the display apparatus for a driving state is provided. When the apparatus is used, perception and understanding of the user for the autonomous driving state can be enhanced from three aspects. To be specific, the autonomous driving state is presented on the HMI, an operation of the autonomous driving system and a vehicle traveling status are rendered, and an operating status of the autonomous driving system is jointly expressed in combination with the speech broadcast.

In one embodiment, based on the embodiment corresponding to FIG. 31, in another embodiment of the display apparatus 30 for a driving state provided in this embodiment of the present disclosure, the display apparatus 30 for a driving state further includes a construction module 340.

The determining module 330 is further configured to determine, from an X-axis provided by a coordinate system, T coordinate values belonging to a detection range corresponding to the target vehicle, where the coordinate system is constructed based on a location of the target vehicle, the X-axis points to a traveling direction of the target vehicle, and T is an integer greater than 1.

The determining module 330 is further configured to calculate T left-lane coordinates by using a left-lane curve equation based on the T coordinate values.

The determining module 330 is further configured to calculate T right-lane coordinates by using a right-lane curve equation based on the T coordinate values.

The construction module 340 is configured to construct a lane center line of the target lane based on the T left-lane coordinates and the T right-lane coordinates; and generate the driving guide line based on the lane center line of the target lane.

In this embodiment of the present disclosure, the display apparatus for a driving state is provided. When the apparatus is used, the lane center line and the driving guide line that are more reliable can be calculated, so that the user can learn a driving path of the vehicle.

In one embodiment, based on the embodiment corresponding to FIG. 31, in another embodiment of the display apparatus 30 for a driving state provided in this embodiment of the present disclosure, the display apparatus 30 for a driving state further includes an obtaining module 350.

The obtaining module 350 is configured to obtain a lane center line of the to-be-changed lane.

The construction module 340 is further configured to draw a vertical line to the lane center line of the to-be-changed lane based on a location of the target vehicle, and use an obtained perpendicular foot as the first vehicle-falling point of the target vehicle.

The obtaining module 350 is further configured to obtain a lane-change speed, lane-change duration, and a steering angle that are of the target vehicle.

The determining module 330 is further configured to determine a lane-change traveling distance based on the lane-change speed, the lane-change duration, and the steering angle.

The determining module 330 is further configured to determine the second vehicle-falling point of the target vehicle based on the first vehicle-falling point and the lane-change traveling distance.

In this embodiment of the present disclosure, the display apparatus for a driving state is provided. When the apparatus is used, a more reliable location of the vehicle-falling point can be calculated, so that the user can learn a driving path of the vehicle.

In one embodiment, based on the embodiment corresponding to FIG. 31, in another embodiment of the display apparatus 30 for a driving state provided in this embodiment of the present disclosure, the display apparatus 30 for a driving state further includes a processing module 360.

The obtaining module 350 is further configured to: before the second stable-state icon is displayed on the driving interface, obtain icon animation data of the second stable-state icon and back-map animation data of a lane back map.

The processing module 360 is configured to generate M frames of to-be-rendered data based on the icon animation data and the back-map animation data, where M is an integer greater than 1.

The processing module 360 is further configured to add the M frames of to-be-rendered data to a message queue.

The obtaining module 350 is further configured to obtain N frames of to-be-rendered data based on the message queue, where N is an integer greater than 1.

The display module 310 is specifically configured to render the N frames of to-be-rendered data, to display the second stable-state icon and the lane back map on the driving interface.

In this embodiment of the present disclosure, the display apparatus for a driving state is provided. When the apparatus is used, icon rendering and rendering of the lane back map are synchronized, thereby implementing picture synchronization and improving visual experience.

In one embodiment, based on the embodiment corresponding to FIG. 31, in another embodiment of the display apparatus 30 for a driving state provided in this embodiment of the present disclosure:

The obtaining module 350 is further configured to: before the second stable-state icon is displayed on the driving interface, obtain icon animation data of the second stable-state icon and speech data of a state-activating message.

The processing module 360 is further configured to generate M frames of to-be-rendered data based on the icon animation data and the speech data, where M is an integer greater than 1.

The processing module 360 is further configured to add the M frames of to-be-rendered data to a message queue.

The obtaining module 350 is further configured to obtain N frames of to-be-rendered data based on the message queue, where N is an integer greater than 1.

The display module 310 is specifically configured to render the N frames of to-be-rendered data, to display the second stable-state icon on the driving interface, and voice-play the state-activating message.

In this embodiment of the present disclosure, the display apparatus for a driving state is provided. When the apparatus is used, icon rendering and speech rendering are synchronized, thereby implementing audio and picture synchronization and improving visual and audio experience.

In one embodiment, based on the embodiment corresponding to FIG. 31, in another embodiment of the display apparatus 30 for a driving state provided in this embodiment of the present disclosure:

The obtaining module 350 is further configured to: before the second stable-state icon is displayed on the driving interface, obtain icon animation data of the second stable-state icon, back-map animation data of a lane back map, and speech data of a state-activating message.

The processing module 360 is further configured to generate M frames of to-be-rendered data based on the icon animation data, the back-map animation data, and the speech data, where M is an integer greater than 1.

The processing module 360 is further configured to add the M frames of to-be-rendered data to a message queue.

The obtaining module 350 is further configured to obtain N frames of to-be-rendered data based on the message queue, where N is an integer greater than 1.

The display module 310 is specifically configured to render the N frames of to-be-rendered data, to display the second stable-state icon and the lane back map on the driving interface, and voice-play the state-activating message.

In this embodiment of the present disclosure, the display apparatus for a driving state is provided. When the apparatus is used, icon rendering, rendering of the lane back map, and speech rendering are synchronized, thereby implementing audio and picture synchronization and improving visual and audio experience.

In one embodiment, based on the embodiment corresponding to FIG. 31, in another embodiment of the display apparatus 30 for a driving state provided in this embodiment of the present disclosure:

The obtaining module 350 is specifically configured to obtain K consecutive frames of to-be-rendered data from the message queue, where K is an integer greater than 2; and discard at least two consecutive frames of to-be-rendered data in the K frames of to-be-rendered data, to obtain the N frames of to-be-rendered data.

In this embodiment of the present disclosure, the display apparatus for a driving state is provided. When the apparatus is used, a problem that a data production capability does not match a data processing speed is resolved, a case that data is accumulated in the message queue is prevented, and the manner is applicable to a scenario with a high requirement on data updating.

In one embodiment, based on the embodiment corresponding to FIG. 31, in another embodiment of the display apparatus 30 for a driving state provided in this embodiment of the present disclosure:

The obtaining module 350 is specifically configured to obtain K consecutive frames of to-be-rendered data from the message queue, where K is an integer greater than 2; and discard at least two non-consecutive frames of to-be-rendered data in the K frames of to-be-rendered data, to obtain the N frames of to-be-rendered data.

In this embodiment of the present disclosure, the display apparatus for a driving state is provided. When the apparatus is used, a problem that a data production capability does not match a data processing speed is resolved, and a case that data is accumulated in the message queue is prevented. In addition, an interval between data can also be reduced based on frame discarding, so that the rendering freezing effect is greatly optimized. The manner is applicable to a scenario with a high requirement on data continuity.

Figure 32:
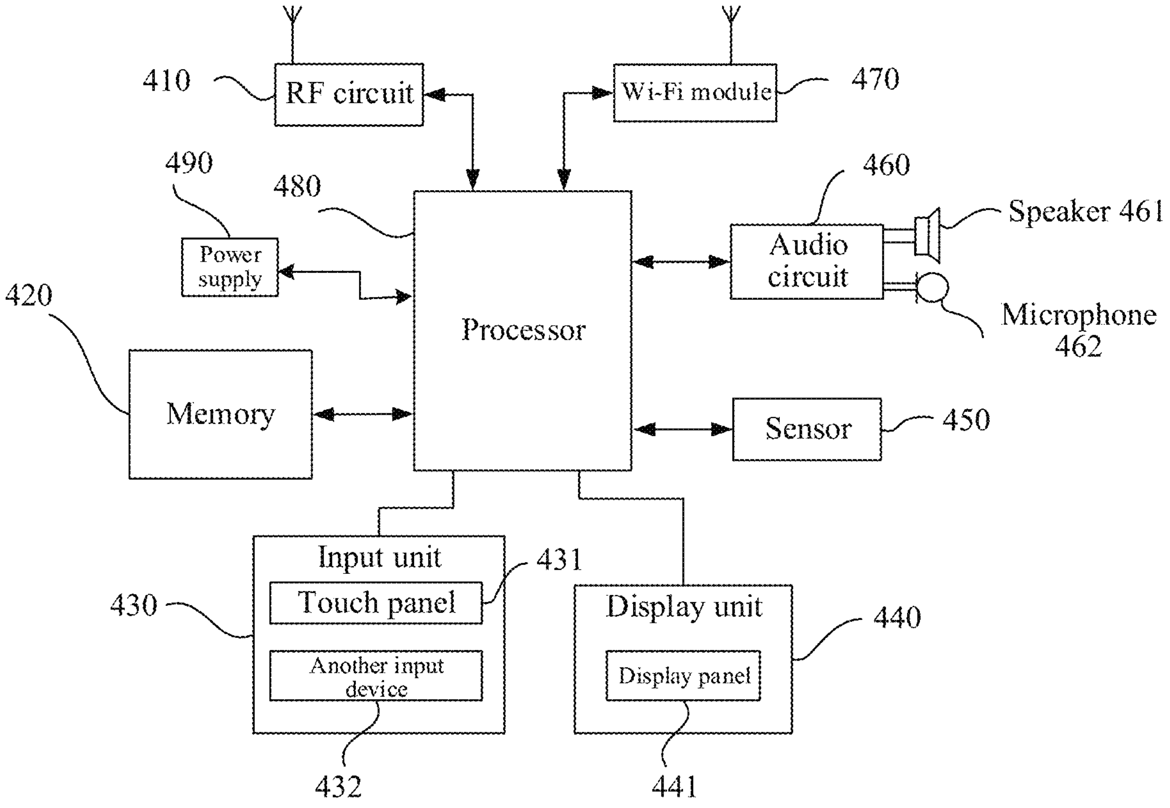
FIG. 32 is a schematic diagram of a structure of a terminal according to an embodiment of the present disclosure.

An embodiment of the present disclosure further provides a terminal. As shown in FIG. 32, for ease of description, only parts related to the embodiments of the present disclosure are shown. For specific technical details that are not disclosed, refer to the method part of the embodiments of the present disclosure. In this embodiment of the present disclosure, an example in which the terminal is a mobile phone is used for description.

FIG. 32 is a block diagram of a part of a structure of the mobile phone related to the terminal provided in this embodiment of the present disclosure. Referring to FIG. 32, the mobile phone includes components such as a radio frequency (RF) circuit 410, a memory 420, an input unit 430, a display unit 440, a sensor 450, an audio circuit 460, a wireless fidelity (Wi-Fi) module 470, a processor 480, and a power supply 490. The input unit 430 may include a touch panel 431 and another input device 432. The display unit 440 may include a display panel 441. The audio circuit 460 may include a speaker 461 and a microphone 462. A person skilled in the art may understand that the structure of the mobile phone shown in FIG. 32 constitutes no limitation on the mobile phone, and the mobile phone may include more or fewer components than those shown in the figure, or some components may be combined, or in different component arrangements.

The memory 420 may be configured to store a software program and a module. The processor 480 executes various functional applications of the mobile phone and processes data by running the software program and the module stored in the memory 420. The memory 420 may mainly include a program storage area and a data storage area. The program storage area may store an operating system, an application program required by at least one function (for example, a sound playback function or an image playback function), and the like. The data storage area may store data (such as audio data or a phone book) created based on use of the mobile phone, and the like. In addition, the memory 420 may include a high-speed random access memory, and may further include a non-volatile memory, for example, at least one magnetic disk storage device, a flash memory device, or another volatile solid-state storage device.

The processor 480 is a control center of the mobile phone, is connected to various parts of the entire mobile phone through various interfaces and lines, and executes various functions of the mobile phone and processes data by running or executing the software program and/or the module stored in the memory 420 and invoking the data stored in the memory 420. In some embodiments, the processor 480 may include one or more processing units. In some embodiments, the processor 480 may integrate an application processor and a modem processor. The application processor mainly processes the operating system, a user interface, an application program, and the like. The modem processor mainly processes wireless communication. Alternatively, the modem processor may not be integrated into the processor 480.

The operations performed by the terminal in the foregoing embodiments may be based on the structure of the terminal shown in FIG. 32.

An embodiment of the present disclosure further provides a computer device, including a memory and a processor. The memory stores a computer program, and the processor executes the computer program, to implement the operations of the methods described in the foregoing embodiments.

An embodiment of the present disclosure further provides a computer-readable storage medium, storing a computer program. When the computer program is executed by a processor, the operations of the methods described in the foregoing embodiments are implemented.

An embodiment of the present disclosure further provides a computer program product, including a computer program. When the computer program is executed by a processor, the operations of the methods described in the foregoing embodiments are implemented.

As disclosed, when a vehicle (e.g., a target vehicle) is in the first driving state, the first stable-state icon may be displayed on the driving interface of the vehicle. When the driving-state switching condition is satisfied, the available-state icon that can be switched to the second driving state is displayed. When the vehicle is switched to the second driving state, the second stable-state icon is displayed. During driving, different driving states may be presented by using the driving interface, so that perception and understanding of a user for the driving states are enhanced in an intelligent icon-display manner.

In the specific implementations of the present disclosure, relevant data such as user information and vehicle information are involved. When the foregoing embodiments of the present disclosure are applied to a specific product or technology, user permission or consent needs to be obtained, and collection, use, and processing of the relevant data need to comply with relevant laws, regulations, and standards of relevant countries and regions.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present disclosure, the disclosed system, apparatus, and method may be implemented in other manners. For example, the described apparatus embodiments are merely examples. For example, division of the units is merely logical function division, and there may be other division during actual implementation. For example, a plurality of units or components may be combined or integrated into another system, or some features may be ignored or not performed. In addition, the displayed or discussed mutual coupling or direct coupling or communication connection may be indirect coupling or a communication connection through some interfaces, apparatuses, or units, and may be in an electronic form, a mechanical form, or another form.

The units described as separate components may or may not be physically separated, and a component displayed as a unit may or may not be a physical unit, that is, may be located in one place, or may be distributed to a plurality of network units. Some or all of the units may be selected based on an actual requirement to achieve the objectives of the solutions of the embodiments.

In addition, the functional units in the embodiments of the present disclosure may be integrated into one processing unit, or each of the units may independently exist physically, or two or more units may be integrated into one unit. The integrated unit may be implemented in a form of hardware or in a form of a software functional unit.

When the integrated unit is implemented in the form of a software functional unit and sold or used as an independent product, the integrated unit may be stored in a computer-readable storage medium. Based on this understanding, the technical solutions of the present disclosure essentially, a part contributing to the related art, or all or a part of the technical solutions may be implemented in a form of a software product. The computer software product is stored in a storage medium, and includes several instructions to enable a computer device (which may be a personal computer, a server, a network device, or the like) to perform all or a part of the operations of the methods in the embodiments of the present disclosure. The storage medium includes any medium that can store a computer program, such as a USB flash drive, a removable hard disk, a read-only memory (ROM), a random access memory (RAM), a magnetic disk, or an optical disc.

In conclusion, the foregoing embodiments are merely intended for describing the technical solutions of the present disclosure, but not for limiting the present disclosure. Although the present disclosure is described in detail with reference to the foregoing embodiments, a person of ordinary skill in the art is to understand that they may still make modifications to the technical solutions described in the foregoing embodiments or make equivalent replacements to a part of technical features thereof, without departing from the spirit and the scope of the technical solutions of the embodiments of the present disclosure.

What is claimed is:

1. A display method for a driving state performed by a computer device, comprising:

displaying a first stable-state icon on a driving interface of a vehicle, the first stable-state icon being configured for prompting that the vehicle is in a first driving state;

displaying a first available-state icon on the driving interface when a driving-state switching condition is satisfied, the first available-state icon being configured for prompting that the vehicle is able to activate a second driving state, the second driving state being an adaptive-cruise-control driving state, a lane-center-control driving state, or a navigate-on-autopilot driving state; and displaying a second stable-state icon and a lane back map on the driving interface in response to the vehicle being switched to the second driving state, the second stable-state icon indicating that the vehicle is in the second driving state, wherein:

the lane back map comprises a target lane on which the vehicle is located;

a presentation form of the target lane comprises at least one of: highlighting the target lane; displaying a lane line of the target lane; or displaying a driving guide line; and in response to that the second driving state is the navigate-on-autopilot driving state and that autonomous lane changing occurs, the method further comprises: displaying a vehicle-falling point for the vehicle on a to-be-changed lane.

2. The display method according to claim 1, wherein the first driving state is a manual driving state, and the second driving state is the adaptive-cruise-control driving state;

the first driving state is the manual driving state, and the second driving state is the lane-center-control driving state;

the first driving state is the manual driving state, and the second driving state is the navigate-on-autopilot driving state;

the first driving state is the adaptive-cruise-control driving state, and the second driving state is the lane-center-control driving state;

the first driving state is the adaptive-cruise-control driving state, and the second driving state is the navigate-on-autopilot driving state; or the first driving state is the lane-center-control driving state, and the second driving the is a navigate-on-autopilot driving state.

3. The display method according to claim 1, further comprising:

playing first dynamic information on the driving interface when the driving-state switching condition is satisfied, wherein the first dynamic information is configured for prompting that the vehicle is able to activate the second driving state; and canceling the playing of the first dynamic information on the driving interface when a play duration of the first dynamic information reaches a first play-duration threshold.

4. The display method according to claim 1, further comprising:

playing second dynamic information on the driving interface in response to the vehicle being switched to the second driving state, wherein the second dynamic information is configured for prompting that the vehicle is in the second driving state; and canceling the playing of the second dynamic information on the driving interface when play duration of the second dynamic information reaches a second play-duration threshold.

5. The display method according to claim 1, further comprising:

displaying a third stable-state icon on the driving interface in response to the vehicle being switched to a third driving state, wherein the third stable-state icon is configured for prompting that the vehicle is in the third driving state.

6. The display method according to claim 5, wherein the first driving state is a manual driving state, the second driving state is the lane-center-control driving state, and the third driving state is the adaptive-cruise-control driving state;

the first driving state is the manual driving state, the second driving state is the navigate-on-autopilot driving state, and the third driving state is the adaptive-cruise-control driving state;

the first driving state is the manual driving state, the second driving state is the navigate-on-autopilot driving state, and the third driving state is the lane-center-control driving state; or the first driving state is the adaptive-cruise-control driving state, the second driving state is the navigate-on-autopilot driving state, and the third driving state is the lane-center-control driving state.

7. The display method according to claim 1, wherein the method further comprises:

voice-playing a state-activating message in response to the vehicle being switched to the second driving state, wherein the state-activating message is configured for prompting that the vehicle is in the second driving state; or in a process of voice-playing a to-be-played message and in response to the vehicle being switched to the second driving state, switching the to-be-played message to the state-activating message, wherein a play priority corresponding to the state-activating message is higher than a play priority corresponding to the to-be-played message; or in the process of voice-playing the to-be-played message and in response to the vehicle being switched to the second driving state, voice-playing the state-activating message after the playing of the to-be-played message ends, wherein a play priority corresponding to the to-be-played message is higher than a play priority corresponding to the state-activating message.

8. The display method according to claim 1, further comprising:

updating the second stable-state icon to a second available-state icon in response to the vehicle quitting the second driving state, wherein the second available-state icon is configured for prompting that the vehicle is able to activate a corresponding driving state; or canceling the displaying of the second stable-state icon on the driving interface in response to the vehicle quitting the second driving state.

9. The display method according to claim 1, wherein the method further comprises:

voice-playing a state-quitting message in response to the vehicle quitting the second driving state, wherein the state-quitting message is configured for prompting that the vehicle quits the second driving state; or the method further comprises:

in a process of voice-playing a to-be-played message and in response to the vehicle quitting the second driving state, switching the to-be-played message to a state-quitting message, wherein a play priority corresponding to the state-quitting message is higher than a play priority corresponding to the to-be-played message; or the method further comprises:

in a process of voice-playing a to-be-played message and in response to the vehicle quitting the second driving state, voice-playing a state-quitting message after the playing of the to-be-played message ends, wherein a play priority corresponding to the to-be-played message is higher than a play priority corresponding to the state-quitting message.

10. The display method according to claim 1, further comprising:

displaying, on a speech setting interface in response to a speech setting instruction, a download control and a preview control, that correspond to a to-be-used tone;

downloading an available speech in response to a selection operation for the download control, and displaying a use control corresponding to the to-be-used tone;

in response to a selection operation for the use control, using the to-be-used tone as a tone for voice-playing; and in response to a selection operation for the preview control, voice-playing a preset text using the to-be-used tone.

11. The display method according to claim 1, wherein the first driving state is a manual driving state; and the displaying of the first stable-state icon on the driving interface of the vehicle comprises:

displaying the first stable-state icon and the lane back map on the driving interface.

12. The display method according to claim 1, wherein displaying the vehicle-falling point for the vehicle on the to-be-changed lane comprises:

displaying a first vehicle-falling point for the vehicle on the to-be-changed lane;

displaying a second vehicle-falling point for the vehicle on the to-be-changed lane, wherein positioning accuracy of the second vehicle-falling point is higher than positioning accuracy of the first vehicle-falling point.

13. The display method according to claim 1, further comprising:

determining, from an X-axis provided by a coordinate system, T coordinate values belonging to a detection range corresponding to the vehicle, wherein the coordinate system is constructed based on a location of the vehicle, the X-axis points to a traveling direction of the vehicle, and T is an integer greater than 1;

calculating T left-lane coordinates by using a left-lane curve equation based on the T coordinate values;

calculating T right-lane coordinates by using a right-lane curve equation based on the T coordinate values;

constructing a lane center line of the target lane based on the T left-lane coordinates and the T right-lane coordinates; and generating the driving guide line based on the lane center line of the target lane.

14. The display method according to claim 12, further comprising:

obtaining a lane center line of the to-be-changed lane;

drawing a vertical line to the lane center line of the to-be-changed lane based on a location of the vehicle, and using an obtained perpendicular foot as the first vehicle-falling point of the vehicle;

obtaining a lane-change speed, lane-change duration, and a steering angle that are of the vehicle;

determining a lane-change traveling distance based on the lane-change speed, the lane-change duration, and the steering angle; and determining the second vehicle-falling point of the vehicle based on the first vehicle-falling point and the lane-change traveling distance.

15. The display method according to claim 1, further comprising:

obtaining icon animation data of the second stable-state icon and back-map animation data of the lane back map;

generating M frames of to-be-rendered data based on the icon animation data and the back-map animation data, wherein M is an integer greater than 1;

adding the M frames of to-be-rendered data to a message queue; and obtaining N frames of to-be-rendered data based on the message queue, wherein N is an integer greater than 1; and displaying the second stable-state icon on the driving interface comprises:

rendering the N frames of to-be-rendered data, to display the second stable-state icon and the lane back map on the driving interface.

16. The display method according to claim 1, further comprising:

obtaining icon animation data of the second stable-state icon and speech data of a state-activating message;

generating M frames of to-be-rendered data based on the icon animation data and the speech data, wherein Mis an integer greater than 1;

adding the M frames of to-be-rendered data to a message queue; and obtaining N frames of to-be-rendered data based on the message queue, wherein N is an integer greater than 1; and displaying the second stable-state icon on the driving interface comprises:

rendering the N frames of to-be-rendered data, to display the second stable-state icon on the driving interface, and voice-playing the state-activating message.

17. The display method according to claim 1, further comprising:

obtaining icon animation data of the second stable-state icon, back-map animation data of the lane back map, and speech data of a state-activating message;

generating M frames of to-be-rendered data based on the icon animation data, the back-map animation data, and the speech data, wherein M is an integer greater than 1;

adding the M frames of to-be-rendered data to a message queue; and obtaining N frames of to-be-rendered data based on the message queue, wherein N is an integer greater than 1; and displaying the second stable-state icon on the driving interface comprises:

rendering the N frames of to-be-rendered data, to display the second stable-state icon and the lane back map on the driving interface, and voice-playing the state-activating message.

18. The display method according to claim 15, wherein the obtaining of the N frames of the to-be-rendered data based on the message queue comprises:

obtaining K consecutive frames of to-be-rendered data from the message queue, wherein K is an integer greater than 2; and discarding at least two consecutive frames of to-be-rendered data in the K frames of to-be-rendered data, to obtain the N frames of to-be-rendered data; or obtaining K consecutive frames of to-be-rendered data from the message queue, wherein K is an integer greater than 2; and discarding at least two non-consecutive frames of to-be-rendered data in the K frames of to-be-rendered data, to obtain the N frames of to-be-rendered data.

19. A computer device, comprising a memory and at least one processor, the memory storing a computer program that, when being executed, causes the at least one processor to perform:

displaying a first stable-state icon on a driving interface of a vehicle, the first stable-state icon being configured for prompting that the vehicle is in a first driving state;

displaying a first available-state icon on the driving interface when a driving-state switching condition is satisfied, the first available-state icon being configured for prompting that the vehicle is able to activate a second driving state, the second driving state being an adaptive-cruise-control driving state, a lane-center-control driving state, or a navigate-on-autopilot driving state; and displaying a second stable-state icon and a lane back map on the driving interface in response to the vehicle being switched to the second driving state, the second stable-state icon indicating that the vehicle is in the second driving state, wherein:

the lane back map comprises a target lane on which the vehicle is located;

a presentation form of the target lane comprises at least one of: highlighting the target lane; displaying a lane line of the target lane; or displaying a driving guide line; and in response to that the second driving state is the navigate-on-autopilot driving state and that autonomous lane changing occurs, the method further comprises: displaying a vehicle-falling point for the vehicle on a to-be-changed lane.

20. A non-transitory computer-readable storage medium, storing a computer program that, when being executed, causes the at least one processor to perform:

displaying a first stable-state icon on a driving interface of a vehicle, the first stable-state icon being configured for prompting that the vehicle is in a first driving state;

displaying a first available-state icon on the driving interface when a driving-state switching condition is satisfied, the first available-state icon being configured for prompting that the vehicle is able to activate a second driving state, the second driving state being an adaptive-cruise-control driving state, a lane-center-control driving state, or a navigate-on-autopilot driving state; and displaying a second stable-state icon and a lane back map on the driving interface in response to the vehicle being switched to the second driving state, the second stable-state icon indicating that the vehicle is in the second driving state, wherein:

the lane back map comprises a target lane on which the vehicle is located;

a presentation form of the target lane comprises at least one of: highlighting the target lane; displaying a lane line of the target lane; or displaying a driving guide line; and in response to that the second driving state is the navigate-on-autopilot driving state and that autonomous lane changing occurs, the method further comprises: displaying a vehicle-falling point for the vehicle on a to-be-changed lane.

* * * * *